(12) United States Patent
Liu et al.

(10) Patent No.: US 10,680,765 B2
(45) Date of Patent: Jun. 9, 2020

(54) CONTROL INFORMATION TRANSMISSION METHOD, AND APPARATUS

(71) Applicant: Huawei Technologies Co., Ltd., Shenzhen, Guangdong (CN)

(72) Inventors: Jianqin Liu, Beijing (CN); Qiang Wu, Beijing (CN); Yongxing Zhou, Beijing (CN); Bingyu Qu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 334 days.

(21) Appl. No.: 15/637,752

(22) Filed: Jun. 29, 2017

(65) Prior Publication Data

US 2017/0302410 A1 Oct. 19, 2017

Related U.S. Application Data

(63) Continuation of application No. PCT/CN2014/095623, filed on Dec. 30, 2014.

(51) Int. Cl.
*H04L 1/18* (2006.01)
*H04W 72/04* (2009.01)
(Continued)

(52) U.S. Cl.
CPC .......... *H04L 1/1854* (2013.01); *H04L 1/1861* (2013.01); *H04W 72/042* (2013.01);
(Continued)

(58) Field of Classification Search
CPC .............. H04L 1/1854; H04L 5/0055; H04W 72/0446; H04W 76/046; H04W 72/042; H04W 72/0413
See application file for complete search history.

(56) References Cited

U.S. PATENT DOCUMENTS 7,054,293 B2 * 5/2006 Tiedemann, Jr. .... H04B 7/2659
370/335
7,519,043 B2 * 4/2009 Porter ................... H04W 16/04
370/294
(Continued)

FOREIGN PATENT DOCUMENTS

CN 101765184 A 6/2010
CN 102752085 A 10/2012
(Continued)

OTHER PUBLICATIONS

Ronghong Jin et al., "Smart antenna in wireless communication", Beijing University of Posts and Telecommunications Press, 2006, 389 pages. (with a partial translation).

*Primary Examiner* — Phung M Chung
(74) *Attorney, Agent, or Firm* — Leydig, Voit & Mayer, Ltd.

(57) ABSTRACT

A control information transmission method, a base station, and user equipment are disclosed. The transmission method includes: sending, by a base station, first control information on a second carrier, where the first control information is used by the base station to send data on a first carrier according to the first control information; and sending, by the base station, the data on the first carrier according to the first control information; where duration of a transmission time interval of the first carrier is less than duration of a transmission time interval of the second carrier.

20 Claims, 6 Drawing Sheets

(51) Int. Cl.
*H04W 76/27* (2018.01)
*H04W 72/12* (2009.01)
*H04L 5/00* (2006.01)
*H04W 88/02* (2009.01)

(52) U.S. Cl.
CPC ... *H04W 72/0413* (2013.01); *H04W 72/0446* (2013.01); *H04W 76/27* (2018.02); *H04L 5/001* (2013.01); *H04L 5/0055* (2013.01); *H04W 72/1289* (2013.01); *H04W 88/02* (2013.01)

(56) References Cited

U.S. PATENT DOCUMENTS

| | | | |
|---|---|---|---|
| 9,042,277 B2 * | 5/2015 | Chen | H04L 5/001 370/280 |
| 9,178,670 B2 * | 11/2015 | Lee | H04L 5/0007 |
| 10,003,986 B2 * | 6/2018 | Liu | H04L 5/0048 |
| 2011/0274099 A1 | 11/2011 | Kwon et al. | |
| 2012/0009923 A1 | 1/2012 | Chen et al. | |
| 2013/0223381 A1 | 8/2013 | Dinan | |
| 2013/0308578 A1 | 11/2013 | Dinan | |
| 2014/0064216 A1 | 3/2014 | Agiwal et al. | |
| 2015/0341865 A1 | 11/2015 | Yang et al. | |
| 2016/0050059 A1 | 2/2016 | Guan et al. | |
| 2017/0353285 A1 * | 12/2017 | Yang | H04L 5/00 |

FOREIGN PATENT DOCUMENTS

| | | |
|---|---|---|
| EP | 2816858 A1 | 12/2014 |
| RU | 2012132431 A | 2/2014 |
| WO | 2014038863 A1 | 3/2014 |
| WO | 2014107052 A1 | 7/2014 |

* cited by examiner

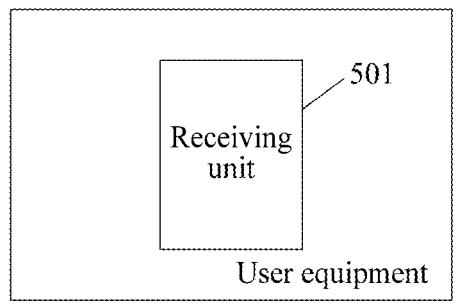
FIG. 5
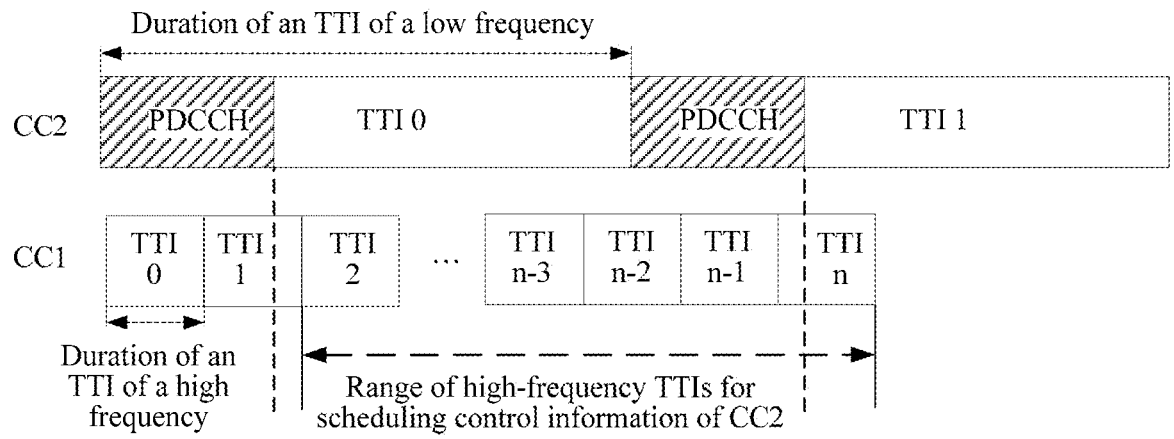
FIG. 6
FIG. 7

CONTROL INFORMATION TRANSMISSION METHOD, AND APPARATUS

CROSS-REFERENCE TO RELATED APPLICATIONS

This application is a continuation of International Application No. PCT/CN2014/095623, filed on Dec. 30, 2014, the disclosure of which is hereby incorporated by reference in its entirety.

TECHNICAL FIELD

Embodiments of the present disclosure relate to the communications field, and in particular, to a control information transmission method, and an apparatus.

BACKGROUND

An existing communications system, for example, a global system for mobile communications (GSM) system, a universal mobile telecommunications system (UMTS), or a Long Term Evolution (LTE) system, usually works in a carrier frequency band below 3 GHz. As intelligent terminals especially video services emerge, a high frequency band, for example, 3 GHz to 250 GHz, is becoming a candidate frequency band for a next-generation communications system.

A large-scale loss usually increases with an increase in a carrier frequency. For example, a path loss of 70 GHz is greater than a path loss of 28 GHz. In addition, factors such as the atmosphere and vegetation all cause a larger-scale loss on a high-frequency carrier. Therefore, channel receiving quality decreases with an increase in a carrier frequency. For a service channel, an increase in a large-scale loss and a decrease in channel receiving quality that are caused by an increase in a carrier frequency may be compensated by using a beamforming technology and a retransmission combining technology, thereby ensuring quality of high-frequency channel transmission. A common channel or signal usually includes control information. For transmission of the common channel or signal, for example, transmission of a broadcast channel, a synchronous signal, or a control channel, a large-scale loss cannot be compensated by using an antenna gain brought by the beamforming technology, because the common channel or signal usually carries some cell public information or signals, and coverage of all user equipment's in an entire cell needs to be ensured so that the user equipment's can receive the common channel or signal. Therefore, a beam used for transmission of the common channel or signal cannot be excessively narrow, and a relatively large antenna gain similar to that of the service channel cannot be obtained. In addition, reliability of the transmission of the common channel/signal cannot be enhanced by using the retransmission combining technology. Therefore, quality and reliability of transmission of a common channel or signal on a high-frequency carrier are relatively poor.

SUMMARY

Embodiments of the present disclosure provide a control information transmission method, and an apparatus, so as to improve reliability of high-frequency control information transmission.

According to a first aspect, a data transmission method is provided, including: sending, by a base station, first control information on a second carrier, where the first control information is used by the base station to send data on a first carrier according to the first control information; and sending, by the base station, the data on the first carrier according to the first control information; where duration of a transmission time interval of the first carrier is less than duration of a transmission time interval of the second carrier.

In a first possible implementation manner, the method further includes: sending, by the base station, carrier indication information on a third carrier, where the carrier indication information is used to indicate a carrier on which the data that is sent by the base station according to the first control information is located.

With reference to the first possible implementation manner, in a second possible implementation manner, the carrier indication information includes a carrier index number, and the carrier index number is used to indicate the carrier on which the data that is sent by the base station according to the first control information is located.

With reference to the first or the second possible implementation manner, in a third possible implementation manner, the carrier indication information further includes at least one of start transmission time interval information, time window length information, or end transmission time interval information, where the start transmission time interval information is used to indicate a start transmission time interval of the data that is sent on the first carrier by the base station, the end transmission time interval information is used to indicate an end transmission time interval of the data that is sent on the first carrier by the base station, and the time window length information is used to indicate a range of a transmission time interval occupied by the data that is sent on the first carrier by the base station.

With reference to the third possible implementation manner, in a fourth possible implementation manner, the sending, by a base station, first control information on a second carrier includes: sending, by the base station, the first control information on a control channel of a first transmission time interval of the second carrier; and the sending, by the base station, the data on the first carrier according to the first control information includes: sending, by the base station, the data according to the first control information and from the start transmission time interval to the end transmission time interval of the first carrier, where the start transmission time interval is a next transmission time interval of a transmission time interval that is of the first carrier and that corresponds to the last symbol occupied by the control channel, and the end transmission time interval is a transmission time interval that is of the first carrier and that corresponds to the last symbol occupied by a control channel of a second transmission time interval, where the second transmission time interval is a next transmission time interval of the first transmission time interval.

With reference to the first to the fourth possible implementation manners, in a fifth possible implementation manner, the third carrier is a primary component carrier.

With reference to the first to the fifth possible implementation manners, in a sixth possible implementation manner, the third carrier and the first or the second carrier are a same carrier.

With reference to the first possible implementation manner, in a seventh possible implementation manner, the first control information includes first time-frequency resource indication information, where the first time-frequency resource indication information is used to indicate a time-frequency resource used by the base station to send the data on the first carrier, and the method further includes: sending, by the base station, second control information on a fourth carrier; and the sending, by the base station, the data on the first carrier according to the first control information includes: sending, by the base station, the data on the first carrier according to the first control information and the second control information, where the second control information includes second time-frequency resource indication information, the second time-frequency resource indication information is used to indicate a time-frequency resource used by the base station to send the data on the first carrier, duration of a transmission time interval of the fourth carrier is greater than the duration of the transmission time interval of the second carrier, and the time-frequency resource of the first carrier that is indicated by the second time-frequency resource indication information includes the time-frequency resource of the first carrier that is indicated by the first time-frequency resource indication information.

With reference to the seventh possible implementation manner, in an eighth possible implementation manner, the base station sends third control information on a fifth carrier; and the sending, by the base station, the data on the first carrier according to the first control information includes: sending, by the base station, the data on the first carrier according to the first control information, the second control information, and the third control information, where the third control information includes third time-frequency resource indication information, the third time-frequency resource indication information is used to indicate a time-frequency resource used by the base station to send the data on the first carrier, duration of a transmission time interval of the fifth carrier is less than the duration of the transmission time interval of the second carrier, and the time-frequency resource of the first carrier that is indicated by the first time-frequency resource indication information includes the time-frequency resource of the first carrier that is indicated by the third time-frequency resource indication information.

With reference to the eighth possible implementation manner, in a ninth possible implementation manner, the base station sends fourth control information on the first carrier; and the sending, by the base station, the data on the first carrier according to the first control information includes: sending, by the base station, the data on the first carrier according to the first control information, the second control information, the third control information, and the fourth control information, where the fourth control information includes fourth time-frequency resource indication information, the fourth time-frequency resource indication information is used to indicate a time-frequency resource used by the base station to send the data on the first carrier, and the time-frequency resource of the first carrier that is indicated by the third time-frequency resource indication information includes the time-frequency resource of the first carrier that is indicated by the fourth time-frequency resource indication information.

With reference to the ninth possible implementation manner, in a tenth possible implementation manner, the frequency domain resource of the first carrier that is indicated by the second time-frequency resource indication information includes the frequency domain resource of the first carrier that is indicated by the first time-frequency resource indication information, the frequency domain resource of the first carrier that is indicated by the first time-frequency resource indication information includes the frequency domain resource of the first carrier that is indicated by the third time-frequency resource indication information, the frequency domain resource of the first carrier that is indicated by the third time-frequency resource indication information includes the frequency domain resource of the first carrier that is indicated by the fourth time-frequency resource indication information.

With reference to the seventh to the tenth possible implementation manners, in an eleventh possible implementation manner, the carrier indication information is further used to indicate a carrier on which the data that is sent by the base station according to the second, the third, or the fourth control information is located.

With reference to the eleventh possible implementation manner, in a twelfth possible implementation manner, the carrier indication information includes a carrier index number, and the carrier index number is used to indicate the carrier on which the data that is sent by the base station according to the second, the third, or the fourth control information is located.

With reference to the seventh to the twelfth implementation manners, in a thirteenth possible implementation manner, the third carrier is a primary component carrier.

With reference to the seventh to the thirteenth possible implementation manners, in a fourteenth possible implementation manner, the fourth carrier or the fifth carrier and the third carrier are a same carrier.

According to a second aspect, a base station is provided, including: a sending unit, configured to send first control information on a second carrier, where the first control information is used by the base station to send data on a first carrier according to the first control information; where the sending unit is further configured to send the data on the first carrier according to the first control information; where duration of a transmission time interval of the first carrier is less than duration of a transmission time interval of the second carrier.

In a first possible implementation manner, the sending unit is further configured to send carrier indication information on a third carrier, where the carrier indication information is used to indicate a carrier on which the data that is sent by the sending unit according to the first control information is located.

With reference to the first possible implementation manner, in a second possible implementation manner, the carrier indication information includes a carrier index number, and the carrier index number is used to indicate the carrier on which the data that is sent by the base station according to the first control information is located.

With reference to the first or the second possible implementation manner, in a third possible implementation manner, the carrier indication information further includes at least one of start transmission time interval information, time window length information, or end transmission time interval information, where the start transmission time interval information is used to indicate a start transmission time interval of the data that is sent on the first carrier by the sending unit, the end transmission time interval information is used to indicate an end transmission time interval of the data that is sent on the first carrier by the sending unit, and the time window length information is used to indicate a range of a transmission time interval occupied by the data that is sent on the first carrier by the sending unit.

With reference to the third possible implementation manner, in a fourth possible implementation manner, that the sending unit is configured to send the first control information on the second carrier includes: the sending unit sends the first control information on a control channel of a first transmission time interval of the second carrier; and that the sending unit is further configured to send the data on the first carrier according to the first control information includes: the sending unit sends the data according to the first control information and from the start transmission time interval to the end transmission time interval of the first carrier, where the start transmission time interval is a next transmission time interval of a transmission time interval that is of the first carrier and that corresponds to the last symbol occupied by the control channel, and the end transmission time interval is a transmission time interval that is of the first carrier and that corresponds to the last symbol occupied by a control channel of a second transmission time interval, where the second transmission time interval is a next transmission time interval of the first transmission time interval.

With reference to the first to the fourth possible implementation manners, in a fifth possible implementation manner, the third carrier is a primary component carrier.

With reference to the first to the fifth possible implementation manners, in a sixth possible implementation manner, the third carrier and the first or the second carrier are a same carrier.

With reference to the first possible implementation manner, in a seventh possible implementation manner, the first control information includes first time-frequency resource indication information, where the first time-frequency resource indication information is used to indicate a time-frequency resource used by the sending unit to send the data on the first carrier, and the base station further includes: the sending unit, further configured to send second control information on a fourth carrier; and the sending, by the sending unit, the data on the first carrier according to the first control information includes: sending, by the sending unit, the data on the first carrier according to the first control information and the second control information, where the second control information includes second time-frequency resource indication information, the second time-frequency resource indication information is used to indicate a time-frequency resource used by the sending unit to send the data on the first carrier, duration of a transmission time interval of the fourth carrier is greater than the duration of the transmission time interval of the second carrier, and the time-frequency resource of the first carrier that is indicated by the second time-frequency resource indication information includes the time-frequency resource of the first carrier that is indicated by the first time-frequency resource indication information.

With reference to the seventh possible implementation manner, in an eighth possible implementation manner, the base station further includes: the sending unit, further configured to send third control information on a fifth carrier; and the sending, by the sending unit, the data on the first carrier according to the first control information includes: sending, by the sending unit, the data on the first carrier according to the first control information, the second control information, and the third control information, where the third control information includes third time-frequency resource indication information, the third time-frequency resource indication information is used to indicate a time-frequency resource used by the sending unit to send the data on the first carrier, duration of a transmission time interval of the fifth carrier is less than the duration of the transmission time interval of the second carrier, and the time-frequency resource of the first carrier that is indicated by the first time-frequency resource indication information includes the time-frequency resource of the first carrier that is indicated by the third time-frequency resource indication information.

With reference to the eighth possible implementation manner, in a ninth possible implementation manner, the sending unit is further configured to send fourth control information on the first carrier; and the sending, by the sending unit, the data on the first carrier according to the first control information includes: sending, by the sending unit, the data on the first carrier according to the first control information, the second control information, the third control information, and the fourth control information, where the fourth control information includes fourth time-frequency resource indication information, the fourth time-frequency resource indication information is used to indicate a time-frequency resource used by the sending unit to send the data on the first carrier, and the time-frequency resource of the first carrier that is indicated by the third time-frequency resource indication information includes the time-frequency resource of the first carrier that is indicated by the fourth time-frequency resource indication information.

With reference to the ninth possible implementation manner, in a tenth possible implementation manner, the frequency domain resource of the first carrier that is indicated by the second time-frequency resource indication information includes the frequency domain resource of the first carrier that is indicated by the first time-frequency resource indication information, the frequency domain resource of the first carrier that is indicated by the first time-frequency resource indication information includes the frequency domain resource of the first carrier that is indicated by the third time-frequency resource indication information, the frequency domain resource of the first carrier that is indicated by the third time-frequency resource indication information includes the frequency domain resource of the first carrier that is indicated by the fourth time-frequency resource indication information.

With reference to the seventh to the tenth possible implementation manners, in an eleventh possible implementation manner, the carrier indication information is further used to indicate a carrier on which the data that is sent by the sending unit according to the second, the third, or the fourth control information is located.

With reference to the eleventh possible implementation manner, in a twelfth possible implementation manner, the carrier indication information includes a carrier index number, and the carrier index number is used to indicate the carrier on which the data that is sent by the sending unit according to the second, the third, or the fourth control information is located.

With reference to the seventh to the twelfth possible implementation manners, in a thirteenth possible implementation manner, the third carrier is a primary component carrier.

With reference to the seventh to the thirteenth possible implementation manners, in a fourteenth possible implementation manner, the fourth carrier or the fifth carrier and the third carrier are a same carrier.

According to a third aspect, a control information receiving method is provided, including: receiving, by user equipment, first control information on a second carrier, where the first control information is used by the user equipment to receive data on a first carrier according to the first control information; and receiving, by the user equipment, the data on the first carrier according to the first control information; where duration of a transmission time interval of the first carrier is less than duration of a transmission time interval of the second carrier.

In a first possible implementation manner, the method further includes: receiving, by the user equipment, carrier indication information on a third carrier, where the carrier indication information is used to indicate a carrier on which the data that is received by the user equipment according to the first control information is located.

With reference to the first possible implementation manner, in a second possible implementation manner, the carrier indication information includes a carrier index number, and the carrier index number is used to indicate the carrier on which the data that is received by the user equipment according to the first control information is located.

With reference to the first or the second possible implementation manner, in a third possible implementation manner, the carrier indication information further includes at least one of start transmission time interval information, time window length information, or end transmission time interval information, where the start transmission time interval information is used to indicate a start transmission time interval of the data that is received on the first carrier by the user equipment, the end transmission time interval information is used to indicate an end transmission time interval of the data that is received on the first carrier by the user equipment, and the time window length information is used to indicate a range of a transmission time interval occupied by the data that is received on the first carrier by the user equipment.

With reference to the third possible implementation manner, in a fourth possible implementation manner, the receiving, by user equipment, first control information on a second carrier includes: receiving, by the user equipment, the first control information on a control channel of a first transmission time interval of the second carrier; and the receiving, by the user equipment, the data on the first carrier according to the first control information includes: receiving, by the user equipment, the data according to the first control information and from the start transmission time interval to the end transmission time interval of the first carrier, where the start transmission time interval is a next transmission time interval of a transmission time interval that is of the first carrier and that corresponds to the last symbol occupied by the control channel, and the end transmission time interval is a transmission time interval that is of the first carrier and that corresponds to the last symbol occupied by a control channel of a second transmission time interval, where the second transmission time interval is a next transmission time interval of the first transmission time interval.

With reference to the first to the fourth possible implementation manners, in a fifth possible implementation manner, the third carrier is a primary component carrier.

With reference to the first to the fifth possible implementation manners, in a sixth possible implementation manner, the third carrier and the first or the second carrier are a same carrier.

With reference to the first possible implementation manner, in a seventh possible implementation manner, the first control information includes first time-frequency resource indication information, where the first time-frequency resource indication information is used to indicate a time-frequency resource used by the user equipment to receive the data on the first carrier, and the method further includes: receiving, by the user equipment, second control information on a fourth carrier; and the receiving, by the user equipment, the data on the first carrier according to the first control information includes: receiving, by the user equipment, the data on the first carrier according to the first control information and the second control information, where the second control information includes second time-frequency resource indication information, the second time-frequency resource indication information is used to indicate a time-frequency resource used by the user equipment to receive the data on the first carrier, duration of a transmission time interval of the fourth carrier is greater than the duration of the transmission time interval of the second carrier, and the time-frequency resource of the first carrier that is indicated by the second time-frequency resource indication information includes the time-frequency resource of the first carrier that is indicated by the first time-frequency resource indication information.

With reference to the seventh possible implementation manner, in an eighth possible implementation manner, the method further includes: sending, by the user equipment, third control information on a fifth carrier; and the receiving, by the user equipment, the data on the first carrier according to the first control information includes: receiving, by the user equipment, the data on the first carrier according to the first control information, the second control information, and the third control information, where the third control information includes third time-frequency resource indication information, the third time-frequency resource indication information is used to indicate a time-frequency resource used by the user equipment to receive the data on the first carrier, duration of a transmission time interval of the fifth carrier is less than the duration of the transmission time interval of the second carrier, and the time-frequency resource of the first carrier that is indicated by the first time-frequency resource indication information includes the time-frequency resource of the first carrier that is indicated by the third time-frequency resource indication information.

With reference to the eighth possible implementation manner, in a ninth possible implementation manner, the user equipment sends fourth control information on the first carrier; and the receiving, by the user equipment, the data on the first carrier according to the first control information includes: receiving, by the user equipment, the data on the first carrier according to the first control information, the second control information, the third control information, and the fourth control information, where the fourth control information includes fourth time-frequency resource indication information, the fourth time-frequency resource indication information is used to indicate a time-frequency resource used by the user equipment to receive the data on the first carrier, and the time-frequency resource of the first carrier that is indicated by the third time-frequency resource indication information includes the time-frequency resource of the first carrier that is indicated by the fourth time-frequency resource indication information.

With reference to the ninth possible implementation manner, in a tenth possible implementation manner, the frequency domain resource of the first carrier that is indicated by the second time-frequency resource indication information includes the frequency domain resource of the first carrier that is indicated by the first time-frequency resource indication information, the frequency domain resource of the first carrier that is indicated by the first time-frequency resource indication information includes the frequency domain resource of the first carrier that is indicated by the third time-frequency resource indication information, the frequency domain resource of the first carrier that is indicated by the third time-frequency resource indication information includes the frequency domain resource of the first carrier that is indicated by the fourth time-frequency resource indication information.

With reference to the seventh to the tenth possible implementation manners, in an eleventh possible implementation manner, the carrier indication information is further used to indicate a carrier on which the data that is received by the user equipment according to the second, the third, or the fourth control information is located.

With reference to the eleventh possible implementation manner, in a twelfth possible implementation manner, the carrier indication information includes a carrier index number, and the carrier index number is used to indicate the carrier on which the data that is received by the user equipment according to the second, the third, or the fourth control information is located.

With reference to the seventh to the twelfth possible implementation manners, in a thirteenth possible implementation manner, the third carrier is a primary component carrier.

With reference to the seventh to the thirteenth possible implementation manners, in a fourteenth possible implementation manner, the third carrier and the fourth carrier or the fifth carrier are a same carrier.

According to a fourth aspect, user equipment is provided, including: a receiving unit, configured to receive first control information on a second carrier, where the first control information is used by the receiving unit to receive data on a first carrier according to the first control information; where the receiving unit is further configured to receive the data on the first carrier according to the first control information; where duration of a transmission time interval of the first carrier is less than duration of a transmission time interval of the second carrier.

In a first possible implementation manner, the receiving unit receives carrier indication information on a third carrier, where the carrier indication information is used to indicate a carrier on which the data that is received by the user equipment according to the first control information is located.

With reference to the first possible implementation manner, in a second possible implementation manner, the carrier indication information includes a carrier index number, and the carrier index number is used to indicate the carrier on which the data that is received by the receiving unit according to the first control information is located.

With reference to the first or the second possible implementation manner, in a third possible implementation manner, the carrier indication information further includes at least one of start transmission time interval information, time window length information, or end transmission time interval information, where the start transmission time interval information is used to indicate a start transmission time interval of the data that is received on the first carrier by the receiving unit, the end transmission time interval information is used to indicate an end transmission time interval of the data that is received on the first carrier by the receiving unit, and the time window length information is used to indicate a range of a transmission time interval occupied by the data that is received on the first carrier by the receiving unit.

With reference to the third possible implementation manner, in a fourth possible implementation manner, the receiving, by the receiving unit, the first control information on the second carrier includes: receiving, by the receiving unit, the first control information on a control channel of a first transmission time interval of the second carrier; and the receiving, by the receiving unit, the data on the first carrier according to the first control information includes: receiving, by the receiving unit, the data according to the first control information and from the start transmission time interval to the end transmission time interval of the first carrier, where the start transmission time interval is a next transmission time interval of a transmission time interval that is of the first carrier and that corresponds to the last symbol occupied by the control channel, and the end transmission time interval is a transmission time interval that is of the first carrier and that corresponds to the last symbol occupied by a control channel of a second transmission time interval, where the second transmission time interval is a next transmission time interval of the first transmission time interval.

With reference to the first to the fourth possible implementation manners, in a fifth possible implementation manner, the third carrier is a primary component carrier.

With reference to the first to the fifth possible implementation manners, in a sixth possible implementation manner, the third carrier and the first or the second carrier are a same carrier.

With reference to the first possible implementation manner, in a seventh possible implementation manner, the first control information includes first time-frequency resource indication information, where the first time-frequency resource indication information is used to indicate a time-frequency resource used by the receiving unit to receive the data on the first carrier, and the user equipment further includes: the receiving unit, further configured to receive second control information on a fourth carrier; and the receiving, by the receiving unit, the data on the first carrier according to the first control information includes: receiving, by the receiving unit, the data on the first carrier according to the first control information and the second control information, where the second control information includes second time-frequency resource indication information, the second time-frequency resource indication information is used to indicate a time-frequency resource used by the receiving unit to receive the data on the first carrier, duration of a transmission time interval of the fourth carrier is greater than the duration of the transmission time interval of the second carrier, and the time-frequency resource of the first carrier that is indicated by the second time-frequency resource indication information includes the time-frequency resource of the first carrier that is indicated by the first time-frequency resource indication information.

With reference to the seventh possible implementation manner, in an eighth possible implementation manner, the user equipment further includes: the receiving unit, further configured to send third control information on a fifth carrier; and the receiving, by the receiving unit, the data on the first carrier according to the first control information includes: receiving, by the receiving unit, the data on the first carrier according to the first control information, the second control information, and the third control information, where the third control information includes third time-frequency resource indication information, the third time-frequency resource indication information is used to indicate a time-frequency resource used by the receiving unit to receive the data on the first carrier, duration of a transmission time interval of the fifth carrier is less than the duration of the transmission time interval of the second carrier, and the time-frequency resource of the first carrier that is indicated by the first time-frequency resource indication information includes the time-frequency resource of the first carrier that is indicated by the third time-frequency resource indication information.

With reference to the eighth possible implementation manner, in a ninth possible implementation manner, the receiving unit is further configured to send fourth control information on the first carrier; and the receiving, by the receiving unit, the data on the first carrier according to the first control information includes: receiving, by the receiving unit, the data on the first carrier according to the first control information, the second control information, the third control information, and the fourth control information, where the fourth control information includes fourth time-frequency resource indication information, the fourth time-frequency resource indication information is used to indicate a time-frequency resource used by the receiving unit to receive the data on the first carrier, and the time-frequency resource of the first carrier that is indicated by the third time-frequency resource indication information includes the time-frequency resource of the first carrier that is indicated by the fourth time-frequency resource indication information.

With reference to the ninth possible implementation manner, in a tenth possible implementation manner, the frequency domain resource of the first carrier that is indicated by the second time-frequency resource indication information includes the frequency domain resource of the first carrier that is indicated by the first time-frequency resource indication information, the frequency domain resource of the first carrier that is indicated by the first time-frequency resource indication information includes the frequency domain resource of the first carrier that is indicated by the third time-frequency resource indication information, the frequency domain resource of the first carrier that is indicated by the third time-frequency resource indication information includes the frequency domain resource of the first carrier that is indicated by the fourth time-frequency resource indication information.

With reference to the seventh to the tenth possible implementation manners, in an eleventh possible implementation manner, the carrier indication information is further used to indicate a carrier on which the data that is received by the receiving unit according to the second, the third, or the fourth control information is located.

With reference to the eleventh possible implementation manner, in a twelfth possible implementation manner, the carrier indication information includes a carrier index number, and the carrier index number is used to indicate the carrier on which the data that is received by the receiving unit according to the second, the third, or the fourth control information is located.

With reference to the seventh to the twelfth possible implementation manners, in a thirteenth possible implementation manner, the third carrier is a primary component carrier.

With reference to the seventh to the thirteenth possible implementation manners, in a fourteenth possible implementation manner, the third carrier and the fourth carrier or the fifth carrier are a same carrier.

According to a fifth aspect, a control information receiving method is provided, including: sending, by a base station, first data in a first transmission time interval of a first carrier; and receiving, by the base station in a first time unit of a second transmission time interval of a second carrier, first acknowledgment information sent by user equipment, where the first acknowledgment information is used to indicate whether the user equipment correctly receives the first data, and the first transmission time interval of the first carrier is less than the second transmission time interval of the second carrier.

In a first possible implementation manner, the method further includes: receiving, by the base station, the first acknowledgment information in a second time unit of the second transmission time interval of the second carrier, where the first acknowledgment information is used to indicate whether the user equipment correctly receives the first data, and the second time unit and the first time unit are different time units.

In a second possible implementation manner, the method further includes: sending, by the base station, second data in a third transmission time interval of the first carrier, where the third transmission time interval and the first transmission time interval are different transmission time intervals; and receiving, by the base station, second acknowledgment information in the first time unit of the second transmission time interval of the second carrier, where the second acknowledgment information is used to indicate whether the user equipment correctly receives the second data.

With reference to the fifth aspect, or the first to the second possible implementation manners, in a third possible implementation manner, the first carrier is a downlink carrier, and the second carrier is an uplink carrier.

According to a sixth aspect, a base station is provided, including: a sending unit, configured to send first data in a first transmission time interval of a first carrier; and a receiving unit, configured to receive, in a first time unit of a second transmission time interval of a second carrier, first acknowledgment information sent by user equipment, where the first acknowledgment information is used to indicate whether the user equipment correctly receives the first data, and the first transmission time interval of the first carrier is less than the second transmission time interval of the second carrier.

In a first possible implementation manner, the base station further includes: the receiving unit, receiving the first acknowledgment information in a second time unit of the second transmission time interval of the second carrier, where the first acknowledgment information is used to indicate whether the user equipment correctly receives the first data, and the second time unit and the first time unit are different time units.

In a second possible implementation manner, the base station further includes: the sending unit, sending second data in a third transmission time interval of the first carrier, where the third transmission time interval and the first transmission time interval are different transmission time intervals; and the receiving unit, receiving second acknowledgment information in the first time unit of the second transmission time interval of the second carrier, where the second acknowledgment information is used to indicate whether the user equipment correctly receives the second data.

With reference to the sixth aspect, or the first to the second possible implementation manners, in a third possible implementation manner, the first carrier is a downlink carrier, and the second carrier is an uplink carrier.

According to a seventh aspect, a control information transmission method is provided, including: receiving, by user equipment, first data in a first transmission time interval of a first carrier; and sending, by the user equipment, first acknowledgment information in a first time unit of a second transmission time interval of a second carrier, where the first acknowledgment information is used to indicate whether the user equipment correctly receives the first data, and the first transmission time interval of the first carrier is less than the second transmission time interval of the second carrier.

In a first possible implementation manner, the method further includes: sending, by the user equipment, the first acknowledgment information in a second time unit of the second transmission time interval of the second carrier, where the first acknowledgment information is used to indicate whether the user equipment correctly receives the first data, and the second time unit and the first time unit are different time units.

In a second possible implementation manner, the method further includes: receiving, by the user equipment, second data in a third transmission time interval of the first carrier, where the third transmission time interval and the first transmission time interval are different transmission time intervals; and sending, by the user equipment, second acknowledgment information in the first time unit of the second transmission time interval of the second carrier, where the second acknowledgment information is used to indicate whether the user equipment correctly receives the second data.

With reference to the seventh aspect, or the first to the second possible implementation manners, in a third possible implementation manner, the first carrier is a downlink carrier, and the second carrier is an uplink carrier.

According to an eighth aspect, user equipment is provided, including: a receiving unit, configured to receive first data in a first transmission time interval of a first carrier; and a sending unit, configured to send first acknowledgment information in a first time unit of a second transmission time interval of a second carrier, where the first acknowledgment information is used to indicate whether the receiving unit correctly receives the first data, and the first transmission time interval of the first carrier is less than the second transmission time interval of the second carrier.

In a first possible implementation manner, the sending unit is further configured to send the first acknowledgment information in a second time unit of the second transmission time interval of the second carrier, where the first acknowledgment information is used to indicate whether the receiving unit correctly receives the first data, and the second time unit and the first time unit are different time units.

In a second possible implementation manner, the receiving unit is further configured to receive second data in a third transmission time interval of the first carrier, where the third transmission time interval and the first transmission time interval are different transmission time intervals; and the sending unit is further configured to send second acknowledgment information in the first time unit of the second transmission time interval of the second carrier, where the second acknowledgment information is used to indicate whether the receiving unit correctly receives the second data.

With reference to the eighth aspect, or the first to the second possible implementation manners, in a third possible implementation manner, the first carrier is a downlink carrier, and the second carrier is an uplink carrier.

According to the foregoing solutions, duration of a transmission time interval of a first carrier is less than duration of a transmission time interval of a second carrier. Therefore, a frequency of the first carrier is greater than a frequency of the second carrier, that is, compared with the second carrier, the first carrier is a high-frequency carrier. A base station sends data on the first carrier, and sends first control information on the second carrier. Because the frequency of the second carrier is less than the frequency of the first carrier, a large-scale loss on the second carrier is less than a large-scale loss on the first carrier. Therefore, the first control information is sent on the second carrier, thereby improving reliability of transmission of the first control information.

BRIEF DESCRIPTION OF THE DRAWINGS

To describe the technical solutions in the embodiments of the present disclosure more clearly, the following briefly introduces the accompanying drawings required for describing the embodiments or the prior art.

FIG. 5 shows a control information receiving apparatus according to an embodiment of the present disclosure;

FIG. 6 is a schematic diagram of a carrier for communication between a base station and user equipment according to an embodiment of the present disclosure;

FIG. 7 is a schematic diagram of a carrier for communication between a base station and user equipment according to an embodiment of the present disclosure;

DETAILED DESCRIPTION

The following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

It should be understood that the technical solutions of this application may be applied to various communications systems, for example, a GSM system, a UMTS system, an LTE system, and a 5th Generation mobile communications system. This is not limited in the embodiments of this application.

Figure 1:
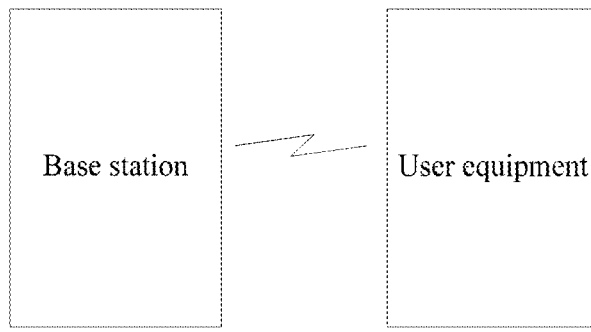
FIG. 1 is a diagram of a system architecture according to an embodiment of the present disclosure.

FIG. 1 is a diagram of a system architecture according to an embodiment of the present disclosure.

A base station provided in this embodiment of the present disclosure may be a Node B (NB) in UMTS, an evolved NodeB (eNodeB, eNB) in LTE, or a base station or controller in a 5th Generation mobile communications system.

User equipment (UE) provided in this embodiment of the present disclosure may be, but is not limited to, a mobile station (MS), a mobile terminal, a mobile telephone, a handset, portable equipment, or the like.

In this embodiment of the present disclosure, the base station sends control information and data to the user equipment, and the user equipment receives the data according to the control information. In a future high-frequency application scenario, both a low-frequency carrier already existing in a current LTE system and multiple consecutive or nonconsecutive high-frequency carriers exist, and a user terminal or another receiving node can simultaneously support multiple frequency ranges. Carriers of different frequencies have different air interface transmission delays. For example, an air interface transmission delay of a low frequency of 2 GHz is 4 ms to 5 ms, while an air interface transmission delay of a relatively high frequency, for example, 28 GHz or 70 GHz is 1 ms. Therefore, carriers of different frequencies have different minimum time granularities, such as a transmission time interval (TTI), and time sequence settings, and a bundling transmission technology based on carriers of multiple different frequencies needs to be considered and designed.

In an optional embodiment, after the user equipment receives the data sent by the base station, the user equipment sends acknowledgment information (ACK) or negative acknowledgment information (NACK) to the base station, to notify the base station whether the user equipment correctly receives the data.

This embodiment of the present disclosure is based on the foregoing system architecture. It should be noted that, without conflicts, the embodiments and features in the embodiments may be mutually combined.

Figure 2:
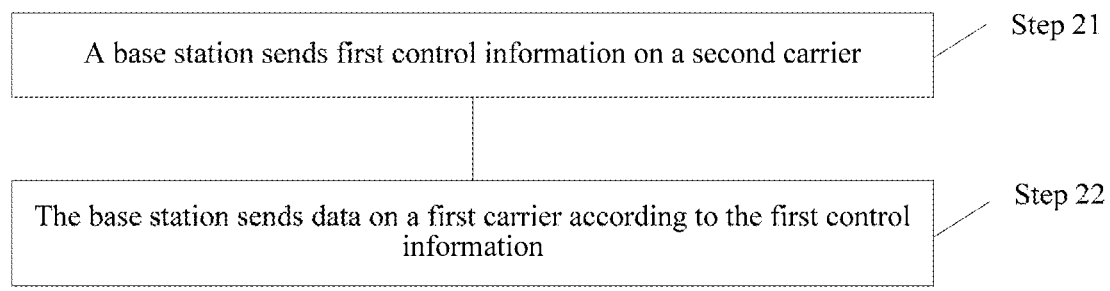
FIG. 2 shows a control information transmission method according to an embodiment of the present disclosure.

FIG. 2 shows a control information transmission method according to an embodiment of the present disclosure. The method includes the following steps.

Step 21: A base station sends first control information on a second carrier. The first control information is used by the base station to send data on a first carrier according to the first control information. Optionally, the first carrier is a high-frequency carrier, and a frequency range of the high-frequency carrier is 3 GHz to 250 GHz. Optionally, the first control information may be at least one of downlink control information, downlink data transmission scheduling information, uplink data transmission scheduling information, or an uplink power control command.

Step 22: The base station sends the data on the first carrier according to the first control information. Duration of a transmission time interval of the first carrier is less than duration of a transmission time interval of the second carrier.

Optionally, a frequency of the second carrier is less than a frequency of the first carrier. Optionally, the transmission time interval is a subframe.

Duration of a transmission time interval of a first carrier is less than duration of a transmission time interval of a second carrier. Therefore, a frequency of the first carrier is greater than a frequency of the second carrier, that is, compared with the second carrier, the first carrier is a high-frequency carrier. A base station sends data on the first carrier, and sends first control information on the second carrier. Because the frequency of the second carrier is less than the frequency of the first carrier, a large-scale loss on the second carrier is less than a large-scale loss on the first carrier. Therefore, the first control information is sent on the second carrier, thereby improving reliability of transmission of the first control information.

In an optional embodiment, the base station sends carrier indication information on a third carrier, where the carrier indication information is used to indicate a carrier on which the data that is sent by the base station according to the first control information is located. Optionally, the carrier indication information is used to indicate the first carrier.

In an optional embodiment, the carrier indication information includes a carrier index number, and the carrier index number is used to indicate the carrier on which the data that is sent by the base station according to the first control information is located. Optionally, the carrier index number indicates the first carrier.

In an optional embodiment, the carrier indication information further includes at least one of start transmission time interval information, time window length information, or end transmission time interval information. The start transmission time interval information is used to indicate a start transmission time interval of the data that is sent on the first carrier by the base station, the end transmission time interval information is used to indicate an end transmission time interval of the data that is sent on the first carrier by the base station, and the time window length information is used to indicate a range of a transmission time interval occupied by the data that is sent on the first carrier by the base station.

In an optional embodiment, step 21 of sending, by a base station, first control information on a second carrier includes: sending, by the base station, the first control information on a control channel of a first transmission time interval of the second carrier. Step 22 of sending, by the base station, the data on the first carrier according to the first control information includes: sending, by the base station, the data according to the first control information and from the start transmission time interval to the end transmission time interval of the first carrier. The start transmission time interval is a next transmission time interval of a transmission time interval that is of the first carrier and that corresponds to the last symbol occupied by the control channel, and the end transmission time interval is a transmission time interval that is of the first carrier and that corresponds to the last symbol occupied by a control channel of a second transmission time interval, where the second transmission time interval is a next transmission time interval of the first transmission time interval.

In an optional embodiment, the third carrier is a primary component carrier.

In an optional embodiment, the third carrier and the first or the second carrier are a same carrier.

In an optional embodiment, the first control information includes first time-frequency resource indication information, where the first time-frequency resource indication information is used to indicate a time-frequency resource used by the base station to send the data on the first carrier, and the method further includes: sending, by the base station, second control information on a fourth carrier; and the sending, by the base station, the data on the first carrier according to the first control information includes: sending, by the base station, the data on the first carrier according to the first control information and the second control information, where the second control information includes second time-frequency resource indication information, the second time-frequency resource indication information is used to indicate a time-frequency resource used by the base station to send the data on the first carrier, duration of a transmission time interval of the fourth carrier is greater than the duration of the transmission time interval of the second carrier, and the time-frequency resource of the first carrier that is indicated by the second time-frequency resource indication information includes the time-frequency resource of the first carrier that is indicated by the first time-frequency resource indication information. Optionally, a frequency of the fourth carrier is less than a frequency of the second carrier.

In an optional embodiment, the base station sends third control information on a fifth carrier. Step 22 of sending, by the base station, the data on the first carrier according to the first control information includes: sending, by the base station, the data on the first carrier according to the first control information, the second control information, and the third control information, where the third control information includes third time-frequency resource indication information, the third time-frequency resource indication information is used to indicate a time-frequency resource used by the base station to send the data on the first carrier, duration of a transmission time interval of the fifth carrier is less than the duration of the transmission time interval of the second carrier, and the time-frequency resource of the first carrier that is indicated by the first time-frequency resource indication information includes the time-frequency resource of the first carrier that is indicated by the third time-frequency resource indication information. Optionally, a frequency of the fifth carrier is greater than a frequency of the second carrier.

In an optional embodiment, the base station sends fourth control information on the first carrier. Step 22 of sending, by the base station, the data on the first carrier according to the first control information includes: sending, by the base station, the data on the first carrier according to the first control information, the second control information, the third control information, and the fourth control information, where the fourth control information includes fourth time-frequency resource indication information, the fourth time-frequency resource indication information is used to indicate a time-frequency resource used by the base station to send the data on the first carrier, and the time-frequency resource of the first carrier that is indicated by the third time-frequency resource indication information includes the time-frequency resource of the first carrier that is indicated by the fourth time-frequency resource indication information. Optionally, a frequency of the first carrier is greater than a frequency of the fifth carrier.

In an optional embodiment, the frequency domain resource of the first carrier that is indicated by the second time-frequency resource indication information includes the frequency domain resource of the first carrier that is indicated by the first time-frequency resource indication information, the frequency domain resource of the first carrier that is indicated by the first time-frequency resource indication information includes the frequency domain resource of the first carrier that is indicated by the third time-frequency resource indication information, the frequency domain resource of the first carrier that is indicated by the third time-frequency resource indication information includes the frequency domain resource of the first carrier that is indicated by the fourth time-frequency resource indication information.

In an optional embodiment, the carrier indication information is further used to indicate a carrier on which the data that is sent by the base station according to the second, the third, or the fourth control information is located.

In an optional embodiment, the carrier indication information includes a carrier index number, and the carrier index number is used to indicate the carrier on which the data that is sent by the base station according to the second, the third, or the fourth control information is located.

In an optional embodiment, the third carrier is a primary component carrier.

In an optional embodiment, the fourth carrier or the fifth carrier and the third carrier are a same carrier.

Figure 3:
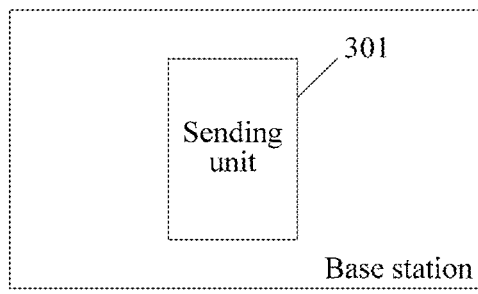
FIG. 3 shows a control information transmission apparatus according to an embodiment of the present disclosure.

FIG. 3 shows a control information transmission apparatus, that is, a base station, according to an embodiment of the present disclosure. The base station is configured to perform the control information transmission method provided in the embodiment shown in FIG. 2.

The base station includes a sending unit 301. The sending unit 301 is configured to send first control information on a second carrier. The first control information is used by the base station to send data on a first carrier according to the first control information. Optionally, the first carrier is a high-frequency carrier, and a frequency range of the high-frequency carrier is 3 GHz to 250 GHz. Optionally, the first control information may be at least one of downlink control information, downlink data transmission scheduling information, uplink data transmission scheduling information, or an uplink power control command.

The sending unit 301 is further configured to send the data on the first carrier according to the first control information. Duration of a transmission time interval of the first carrier is less than duration of a transmission time interval of the second carrier.

Optionally, a frequency of the second carrier is less than a frequency of the first carrier. Optionally, the transmission time interval is a subframe.

Duration of a transmission time interval of a first carrier is less than duration of a transmission time interval of a second carrier. Therefore, a frequency of the first carrier is greater than a frequency of the second carrier, that is, compared with the second carrier, the first carrier is a high-frequency carrier. A base station sends data on the first carrier, and sends first control information on the second carrier. Because the frequency of the second carrier is less than the frequency of the first carrier, a large-scale loss on the second carrier is less than a large-scale loss on the first carrier. Therefore, the first control information is sent on the second carrier, thereby improving reliability of transmission of the first control information.

In an optional embodiment, the sending unit 301 is further configured to send carrier indication information on a third carrier, where the carrier indication information is used to indicate a carrier on which the data that is sent by the sending unit 301 according to the first control information is located. Optionally, the carrier indication information is used to indicate the first carrier.

In an optional embodiment, the carrier indication information includes a carrier index number, and the carrier index number is used to indicate the carrier on which the data that is sent by the base station according to the first control information is located. Optionally, the carrier index number indicates the first carrier.

In an optional embodiment, the carrier indication information further includes at least one of start transmission time interval information, time window length information, or end transmission time interval information. The start transmission time interval information is used to indicate a start transmission time interval of the data that is sent on the first carrier by the sending unit 301, the end transmission time interval information is used to indicate an end transmission time interval of the data that is sent on the first carrier by the sending unit 301, and the time window length information is used to indicate a range of a transmission time interval occupied by the data that is sent on the first carrier by the sending unit 301.

In an optional embodiment, that the sending unit 301 is configured to send the first control information on the second carrier includes: the sending unit 301 sends the first control information on a control channel of a first transmission time interval of the second carrier; and that the sending unit 301 is further configured to send the data on the first carrier according to the first control information includes: the sending unit 301 sends the data according to the first control information and from the start transmission time interval to the end transmission time interval of the first carrier, where the start transmission time interval is a next transmission time interval of a transmission time interval that is of the first carrier and that corresponds to the last symbol occupied by the control channel, and the end transmission time interval is a transmission time interval that is of the first carrier and that corresponds to the last symbol occupied by a control channel of a second transmission time interval, where the second transmission time interval is a next transmission time interval of the first transmission time interval.

In an optional embodiment, the third carrier is a primary component carrier.

In an optional embodiment, the third carrier and the first or the second carrier are a same carrier.

In an optional embodiment, the first control information includes first time-frequency resource indication information, where the first time-frequency resource indication information is used to indicate a time-frequency resource used by the sending unit 301 to send the data on the first carrier, and the base station further includes: the sending unit 301, further configured to send second control information on a fourth carrier; and the sending, by the sending unit 301, the data on the first carrier according to the first control information includes: sending, by the sending unit 301, the data on the first carrier according to the first control information and the second control information, where the second control information includes second time-frequency resource indication information, the second time-frequency resource indication information is used to indicate a time-frequency resource used by the sending unit 301 to send the data on the first carrier, duration of a transmission time interval of the fourth carrier is greater than the duration of the transmission time interval of the second carrier, and the time-frequency resource of the first carrier that is indicated by the second time-frequency resource indication information includes the time-frequency resource of the first carrier that is indicated by the first time-frequency resource indication information. Optionally, a frequency of the fourth carrier is less than a frequency of the second carrier.

In an optional embodiment, the base station further includes: the sending unit 301, further configured to send third control information on a fifth carrier. The sending, by the sending unit 301, the data on the first carrier according to the first control information includes: sending, by the sending unit 301, the data on the first carrier according to the first control information, the second control information, and the third control information, where the third control information includes third time-frequency resource indication information, the third time-frequency resource indication information is used to indicate a time-frequency resource used by the sending unit 301 to send the data on the first carrier, duration of a transmission time interval of the fifth carrier is less than the duration of the transmission time interval of the second carrier, and the time-frequency resource of the first carrier that is indicated by the first time-frequency resource indication information includes the time-frequency resource of the first carrier that is indicated by the third time-frequency resource indication information. Optionally, a frequency of the fifth carrier is greater than a frequency of the second carrier.

In an optional embodiment, the sending unit 301 is further configured to send fourth control information on the first carrier. The sending, by the sending unit 301, the data on the first carrier according to the first control information includes: sending, by the sending unit 301, the data on the first carrier according to the first control information, the second control information, the third control information, and the fourth control information, where the fourth control information includes fourth time-frequency resource indication information, the fourth time-frequency resource indication information is used to indicate a time-frequency resource used by the sending unit 301 to send the data on the first carrier, and the time-frequency resource of the first carrier that is indicated by the third time-frequency resource indication information includes the time-frequency resource of the first carrier that is indicated by the fourth time-frequency resource indication information. Optionally, a frequency of the first carrier is greater than a frequency of the fifth carrier.

In an optional embodiment, the frequency domain resource of the first carrier that is indicated by the second time-frequency resource indication information includes the frequency domain resource of the first carrier that is indicated by the first time-frequency resource indication information, the frequency domain resource of the first carrier that is indicated by the first time-frequency resource indication information includes the frequency domain resource of the first carrier that is indicated by the third time-frequency resource indication information, the frequency domain resource of the first carrier that is indicated by the third time-frequency resource indication information includes the frequency domain resource of the first carrier that is indicated by the fourth time-frequency resource indication information.

In an optional embodiment, the carrier indication information is further used to indicate a carrier on which the data that is sent by the sending unit 301 according to the second, the third, or the fourth control information is located.

In an optional embodiment, the carrier indication information includes a carrier index number, and the carrier index number is used to indicate the carrier on which the data that is sent by the sending unit 301 according to the second, the third, or the fourth control information is located.

In an optional embodiment, the third carrier is a primary component carrier.

In an optional embodiment, the fourth carrier or the fifth carrier and the third carrier are a same carrier.

In an optional implementation manner, the sending unit 301 may be a transmitter. Alternatively, the sending unit 301 may be implemented by using a transceiver. The transmitter and the transceiver may be a radio frequency circuit or a combination that includes the processor and a radio frequency circuit. The base station includes a transmitter. The transmitter is configured to send first control information on a second carrier, where the first control information is used by the base station to send data on a first carrier according to the first control information. The transmitter is further configured to send the data on the first carrier according to the first control information, where duration of a transmission time interval of the first carrier is less than duration of a transmission time interval of the second carrier.

Figure 4:
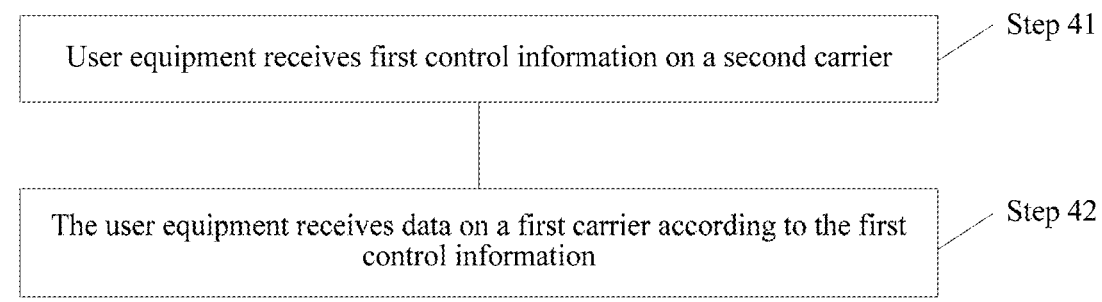
FIG. 4 shows a control information receiving method according to an embodiment of the present disclosure.

FIG. 4 shows a control information receiving method according to an embodiment of the present disclosure. The method includes the following steps.

Step 41: User equipment receives first control information on a second carrier. The first control information is used by the user equipment to receive data on a first carrier according to the first control information. Optionally, the first carrier is a high-frequency carrier. Optionally, a frequency range of the high-frequency carrier is 3 GHz to 250 GHz. Optionally, the first control information may be at least one of downlink control information, downlink data transmission scheduling information, uplink data transmission scheduling information, or an uplink power control command.

Step 42: The user equipment receives the data on the first carrier according to the first control information. Duration of a transmission time interval of the first carrier is less than duration of a transmission time interval of the second carrier. Optionally, the first control information may be at least one of downlink control information, downlink data transmission scheduling information, uplink data transmission scheduling information, or an uplink power control command. Optionally, a frequency of the second carrier is less than a frequency of the first carrier. Optionally, the transmission time interval is a subframe.

Duration of a transmission time interval of a first carrier is less than duration of a transmission time interval of a second carrier. Therefore, a frequency of the first carrier is greater than a frequency of the second carrier, that is, compared with the second carrier, the first carrier is a high-frequency carrier. A base station sends data on the first carrier, and sends first control information on the second carrier. Because the frequency of the second carrier is less than the frequency of the first carrier, a large-scale loss on the second carrier is less than a large-scale loss on the first carrier. Therefore, the first control information is sent on the second carrier, thereby improving reliability of transmission of the first control information.

In an optional embodiment, the user equipment receives carrier indication information on a third carrier, where the carrier indication information is used to indicate a carrier on which the data that is received by the user equipment according to the first control information is located. Optionally, the carrier indication information is used to indicate the first carrier.

In an optional embodiment, the carrier indication information includes a carrier index number, and the carrier index number is used to indicate the carrier on which the data that is received by the user equipment according to the first control information is located. Optionally, the carrier index number indicates the first carrier.

In an optional embodiment, the carrier indication information further includes at least one of start transmission time interval information, time window length information, or end transmission time interval information. The start transmission time interval information is used to indicate a start transmission time interval of the data that is received on the first carrier by the user equipment, the end transmission time interval information is used to indicate an end transmission time interval of the data that is received on the first carrier by the user equipment, and the time window length information is used to indicate a range of a transmission time interval occupied by the data that is received on the first carrier by the user equipment.

In an optional embodiment, step 41 of receiving, by user equipment, first control information on a second carrier includes: receiving, by the user equipment, the first control information on a control channel of a first transmission time interval of the second carrier. Step 42 of receiving, by the user equipment, the data on the first carrier according to the first control information includes: receiving, by the user equipment, the data according to the first control information and from the start transmission time interval to the end transmission time interval of the first carrier, where the start transmission time interval is a next transmission time interval of a transmission time interval that is of the first carrier and that corresponds to the last symbol occupied by the control channel, and the end transmission time interval is a transmission time interval that is of the first carrier and that corresponds to the last symbol occupied by a control channel of a second transmission time interval, where the second transmission time interval is a next transmission time interval of the first transmission time interval.

In an optional embodiment, the third carrier is a primary component carrier.

In an optional embodiment, the third carrier and the first or the second carrier are a same carrier.

In an optional embodiment, the first control information includes first time-frequency resource indication information, where the first time-frequency resource indication information is used to indicate a time-frequency resource used by the user equipment to receive the data on the first carrier, and the method further includes: receiving, by the user equipment, second control information on a fourth carrier. Step 42 of receiving, by the user equipment, the data on the first carrier according to the first control information includes: receiving, by the user equipment, the data on the first carrier according to the first control information and the second control information, where the second control information includes second time-frequency resource indication information, the second time-frequency resource indication information is used to indicate a time-frequency resource used by the user equipment to receive the data on the first carrier, duration of a transmission time interval of the fourth carrier is greater than the duration of the transmission time interval of the second carrier, and the time-frequency resource of the first carrier that is indicated by the second time-frequency resource indication information includes the time-frequency resource of the first carrier that is indicated by the first time-frequency resource indication information. Optionally, a frequency of the fourth carrier is less than a frequency of the second carrier.

In an optional embodiment, the user equipment sends third control information on a fifth carrier. Step 42 of receiving, by the user equipment, the data on the first carrier according to the first control information includes: receiving, by the user equipment, the data on the first carrier according to the first control information, the second control information, and the third control information, where the third control information includes third time-frequency resource indication information, the third time-frequency resource indication information is used to indicate a time-frequency resource used by the user equipment to receive the data on the first carrier, duration of a transmission time interval of the fifth carrier is less than the duration of the transmission time interval of the second carrier, and the time-frequency resource of the first carrier that is indicated by the first time-frequency resource indication information includes the time-frequency resource of the first carrier that is indicated by the third time-frequency resource indication information. Optionally, a frequency of the fifth carrier is greater than a frequency of the second carrier.

In an optional embodiment, the user equipment sends fourth control information on the first carrier. Step 42 of receiving, by the user equipment, the data on the first carrier according to the first control information includes: receiving, by the user equipment, the data on the first carrier according to the first control information, the second control information, the third control information, and the fourth control information, where the fourth control information includes fourth time-frequency resource indication information, the fourth time-frequency resource indication information is used to indicate a time-frequency resource used by the user equipment to receive the data on the first carrier, and the time-frequency resource of the first carrier that is indicated by the third time-frequency resource indication information includes the time-frequency resource of the first carrier that is indicated by the fourth time-frequency resource indication information. Optionally, a frequency of the first carrier is greater than a frequency of the fifth carrier.

In an optional embodiment, the frequency domain resource of the first carrier that is indicated by the second time-frequency resource indication information includes the frequency domain resource of the first carrier that is indicated by the first time-frequency resource indication information, the frequency domain resource of the first carrier that is indicated by the first time-frequency resource indication information includes the frequency domain resource of the first carrier that is indicated by the third time-frequency resource indication information, the frequency domain resource of the first carrier that is indicated by the third time-frequency resource indication information includes the frequency domain resource of the first carrier that is indicated by the fourth time-frequency resource indication information.

In an optional embodiment, the carrier indication information is further used to indicate a carrier on which the data that is received by the user equipment according to the second, the third, or the fourth control information is located.

In an optional embodiment, the carrier indication information includes a carrier index number, and the carrier index number is used to indicate the carrier on which the data that is received by the user equipment according to the second, the third, or the fourth control information is located.

In an optional embodiment, the third carrier is a primary component carrier.

In an optional embodiment, the third carrier and the fourth carrier or the fifth carrier are a same carrier.

FIG. 5 shows a control information receiving apparatus, that is, user equipment, according to an embodiment of the present disclosure. The user equipment is configured to perform the control information receiving method provided in the embodiment shown in FIG. 4.

The user equipment includes a receiving unit 501. The receiving unit 501 is configured to receive first control information on a second carrier. The first control information is used by the receiving unit to receive data on a first carrier according to the first control information. Optionally, the first carrier is a high-frequency carrier, and a frequency range of the high-frequency carrier is 3 GHz to 250 GHz. Optionally, the first control information may be at least one of downlink control information, downlink data transmission scheduling information, uplink data transmission scheduling information, or an uplink power control command.

The receiving unit 501 is further configured to receive the data on the first carrier according to the first control information. Duration of a transmission time interval of the first carrier is less than duration of a transmission time interval of the second carrier.

Optionally, a frequency of the second carrier is less than a frequency of the first carrier. Optionally, the transmission time interval is a subframe.

Duration of a transmission time interval of a first carrier is less than duration of a transmission time interval of a second carrier. Therefore, a frequency of the first carrier is greater than a frequency of the second carrier, that is, compared with the second carrier, the first carrier is a high-frequency carrier. A base station sends data on the first carrier, and sends first control information on the second carrier. Because the frequency of the second carrier is less than the frequency of the first carrier, a large-scale loss on the second carrier is less than a large-scale loss on the first carrier. Therefore, the first control information is sent on the second carrier, thereby improving reliability of transmission of the first control information.

In an optional embodiment, the receiving unit 501 is further configured to receive carrier indication information on a third carrier, where the carrier indication information is used to indicate a carrier on which the data that is received by the user equipment according to the first control information is located. Optionally, the carrier indication information is used to indicate the first carrier.

In an optional embodiment, the carrier indication information includes a carrier index number, and the carrier index number is used to indicate the carrier on which the data that is received by the receiving unit according to the first control information is located. Optionally, the carrier index number indicates the first carrier.

In an optional embodiment, the carrier indication information further includes at least one of start transmission time interval information, time window length information, or end transmission time interval information. The start transmission time interval information is used to indicate a start transmission time interval of the data that is received on the first carrier by the receiving unit 501, the end transmission time interval information is used to indicate an end transmission time interval of the data that is received on the first carrier by the receiving unit 501, and the time window length information is used to indicate a range of a transmission time interval occupied by the data that is received on the first carrier by the receiving unit 501.

In an optional embodiment, the receiving, by the receiving unit 501, the first control information on the second carrier includes: receiving, by the receiving unit 501, the first control information on a control channel of a first transmission time interval of the second carrier. The receiving, by the receiving unit 501, the data on the first carrier according to the first control information includes: receiving, by the receiving unit 501, the data according to the first control information and from the start transmission time interval to the end transmission time interval of the first carrier. The start transmission time interval is a next transmission time interval of a transmission time interval that is of the first carrier and that corresponds to the last symbol occupied by the control channel, and the end transmission time interval is a transmission time interval that is of the first carrier and that corresponds to the last symbol occupied by a control channel of a second transmission time interval, where the second transmission time interval is a next transmission time interval of the first transmission time interval.

In an optional embodiment, the third carrier is a primary component carrier.

In an optional embodiment, the third carrier and the first or the second carrier are a same carrier.

In an optional embodiment, the first control information includes first time-frequency resource indication information, where the first time-frequency resource indication information is used to indicate a time-frequency resource used by the receiving unit 501 to receive the data on the first carrier, and the user equipment further includes:

the receiving unit 501, further configured to receive second control information on a fourth carrier; and the receiving, by the receiving unit 501, the data on the first carrier according to the first control information includes: receiving, by the receiving unit 501, the data on the first carrier according to the first control information and the second control information, where the second control information includes second time-frequency resource indication information, the second time-frequency resource indication information is used to indicate a time-frequency resource used by the receiving unit 501 to receive the data on the first carrier, duration of a transmission time interval of the fourth carrier is greater than the duration of the transmission time interval of the second carrier, and the time-frequency resource of the first carrier that is indicated by the second time-frequency resource indication information includes the time-frequency resource of the first carrier that is indicated by the first time-frequency resource indication information. Optionally, a frequency of the fourth carrier is less than a frequency of the second carrier.

In an optional embodiment, the user equipment further includes: the receiving unit 501, further configured to send third control information on a fifth carrier. The receiving, by the receiving unit 501, the data on the first carrier according to the first control information includes: receiving, by the receiving unit 501, the data on the first carrier according to the first control information, the second control information, and the third control information, where the third control information includes third time-frequency resource indication information, the third time-frequency resource indication information is used to indicate a time-frequency resource used by the receiving unit 501 to receive the data on the first carrier, duration of a transmission time interval of the fifth carrier is less than the duration of the transmission time interval of the second carrier, and the time-frequency resource of the first carrier that is indicated by the first time-frequency resource indication information includes the time-frequency resource of the first carrier that is indicated by the third time-frequency resource indication information. Optionally, a frequency of the fifth carrier is greater than a frequency of the second carrier.

In an optional embodiment, the receiving unit 501 is further configured to send fourth control information on the first carrier. The receiving, by the receiving unit 501, the data on the first carrier according to the first control information includes: receiving, by the receiving unit 501, the data on the first carrier according to the first control information, the second control information, the third control information, and the fourth control information, where the fourth control information includes fourth time-frequency resource indication information, the fourth time-frequency resource indication information is used to indicate a time-frequency resource used by the receiving unit 501 to receive the data on the first carrier, and the time-frequency resource of the first carrier that is indicated by the third time-frequency resource indication information includes the time-frequency resource of the first carrier that is indicated by the fourth time-frequency resource indication information. Optionally, a frequency of the first carrier is greater than a frequency of the fifth carrier.

In an optional embodiment, the frequency domain resource of the first carrier that is indicated by the second time-frequency resource indication information includes the frequency domain resource of the first carrier that is indicated by the first time-frequency resource indication information, the frequency domain resource of the first carrier that is indicated by the first time-frequency resource indication information includes the frequency domain resource of the first carrier that is indicated by the third time-frequency resource indication information, the frequency domain resource of the first carrier that is indicated by the third time-frequency resource indication information includes the frequency domain resource of the first carrier that is indicated by the fourth time-frequency resource indication information.

In an optional embodiment, the carrier indication information is further used to indicate a carrier on which the data that is received by the receiving unit 501 according to the second, the third, or the fourth control information is located.

In an optional embodiment, the carrier indication information includes a carrier index number, and the carrier index number is used to indicate the carrier on which the data that is received by the receiving unit 501 according to the second, the third, or the fourth control information is located.

In an optional embodiment, the third carrier is a primary component carrier.

In an optional embodiment, the third carrier and the fourth carrier or the fifth carrier are a same carrier.

In an optional implementation manner, the receiving unit 501 may be a receiver. Alternatively, the receiving unit 501 may be implemented by using a transceiver. The receiver and the transceiver may be a radio frequency circuit or a combination that includes the processor and a radio frequency circuit. The user equipment includes a receiver, configured to receive first control information on a second carrier, where the first control information is used by the receiving unit to receive data on a first carrier according to the first control information, where the receiver is further configured to receive the data on the first carrier according to the first control information, where duration of a transmission time interval of the first carrier is less than duration of a transmission time interval of the second carrier.

This embodiment of the present disclosure is described below in more details with reference to specific examples.

FIG. 6 is a schematic diagram of a carrier for communication between a base station and user equipment according to an embodiment of the present disclosure.

A base station sends first control information on a second carrier CC2. The first control information is used by the base station to send data on a first carrier according to the first control information. The base station sends the data on the first carrier CC1. User equipment receives the first control information on the second carrier CC2. The user equipment receives the data on the first carrier CC1 according to the first control information. Duration of a transmission time interval of the first carrier CC1 is less than duration of a transmission time interval of the second carrier CC2. Optionally, the first carrier CC1 is a high-frequency carrier, and a frequency range of the high-frequency carrier is 3 GHz to 250 GHz. A frequency of the second carrier CC2 is less than the frequency of the first carrier CC1 in step 21. Optionally, the transmission time interval is a subframe.

Duration of a transmission time interval of a first carrier CC1 is less than duration of a transmission time interval of a second carrier CC2. Therefore, a frequency of the first carrier CC1 is greater than a frequency of the second carrier CC2, that is, compared with the second carrier CC2, the first carrier CC1 is a high-frequency carrier. A base station sends data on the first carrier CC1, and sends first control information on the second carrier CC2. Because the frequency of the second carrier is less than the frequency of the first carrier CC1, a large-scale loss on the second carrier CC2 is less than a large-scale loss on the first carrier CC1. Therefore, reliability of sending the first control information on the second carrier CC2 is higher than reliability of sending the first control information on the first carrier CC1, thereby improving reliability of transmission of the first control information.

The duration of the transmission time interval of the second carrier CC2 is greater than the duration of the transmission time interval of the first carrier CC1. As shown in FIG. 6, one transmission time interval of the second carrier CC2 spans 10 transmission time intervals of the first carrier CC1. Therefore, the first control information sent on the second carrier CC2 is to be used to schedule all transmission time intervals of the first carrier CC1 that correspond to the transmission time interval of the second carrier CC2. For example, as shown in FIG. 6, a transmission time interval 0 of the second carrier CC2 spans 10 transmission time intervals 0 to 9 of the first carrier CC1 in the time domain. Therefore, control information that corresponds to data that is sent in the transmission time intervals 0 to 9 of the first carrier CC1 by the base station is to be sent on the transmission time interval 0 of the second carrier CC2. Optionally, respective control information of the data in the transmission time intervals 0 to 9 of the first carrier CC1 may be the same, or may be separately different. Control information being the same means that the data in the transmission time intervals 0 to 9 of the first carrier CC1 may be received by the user equipment according to an instruction of same control information. Control information being different means that data in any transmission time interval of the first carrier CC1 may be received by the user equipment according to an instruction of control information corresponding to the any time interval. For example, data in a transmission time interval of the first carrier CC1 is received by the user equipment according to control information corresponding to the transmission time interval, where i is any integer greater than or equal to 0 and less than or equal to 9. The control information in the transmission time intervals 0 to 9 of the first carrier CC1 may be code division multiplexed to the transmission time interval 0 of the second carrier CC2.

In an optional embodiment, the base station sends carrier indication information on a third carrier CC3 (not shown in FIG. 6). The carrier indication information is used to indicate a carrier on which the data that is sent by the base station according to the first control information is located. In an optional embodiment, the carrier indication information is used to indicate the first carrier CC1. The carrier indication information may be in a format of a byte stream, that is, in a form of a bitmap, or in a representation form of a binomial, for example, a best-M method. Optionally, a format of control information that is on a low-frequency carrier and that is used to schedule transmission data of a high-frequency carrier may be different from a format of control information that is on the low-frequency carrier and that is used to schedule transmission data of the low-frequency carrier.

In an optional embodiment, the carrier indication information includes a carrier index number, and the carrier index number is used to indicate the carrier on which the data that is sent by the base station according to the first control information is located. Optionally, the carrier index number is used to indicate the first carrier CC1. In an optional embodiment, the third carrier CC3 is a primary component carrier.

In an optional embodiment, the third carrier CC3 and the first carrier CC1 or the second carrier CC2 are a same carrier. The base station may also send the carrier indication information on the first carrier CC1 or the second carrier CC2.

In an optional embodiment, the first control information includes first time-frequency resource indication information, where the first time-frequency resource indication information is used to indicate a time-frequency resource used by the base station to send the data on the first carrier. The base station sends second control information on a fourth carrier CC4. The user equipment receives the second control information on the fourth carrier CC4. The base station sends the data on the first carrier according to the first control information and the second control information. The user equipment receives the data on the first carrier according to the first control information and the second control information. The second control information includes second time-frequency resource indication information, and the second time-frequency resource indication information is used to indicate a time-frequency resource used by the base station to send the data on the first carrier. Duration of a transmission time interval of the fourth carrier CC4 is greater than the duration of the transmission time interval of the second carrier CC2. The time-frequency resource of the first carrier that is indicated by the second time-frequency resource indication information includes the time-frequency resource of the first carrier that is indicated by the first time-frequency resource indication information. As shown in FIG. 6, the second control information in a transmission time interval 0 of the fourth carrier CC4 is to be used by the user equipment to receive data in 20 transmission time intervals of the first carrier CC1. The first control information in a transmission time interval 0 of the second carrier CC2 is to be used by the user equipment to receive data in 10 transmission time intervals of the first carrier CC1. The time-frequency resource of the first carrier that is indicated by the second time-frequency resource indication information includes the time-frequency resource of the first carrier that is indicated by the first time-frequency resource indication information. Optionally, a frequency of the fourth carrier CC4 is less than the frequency of the second carrier CC2.

In an optional embodiment, the base station sends third control information on a fifth carrier CC5. The user equipment receives the third control information on the fifth carrier CC5. The base station sends the data on the first carrier according to the first control information, the second control information, and the third control information. The user equipment receives the data on the first carrier according to the first control information, the second control information, and the third control information. The third control information includes third time-frequency resource indication information, and the third time-frequency resource indication information is used to indicate a time-frequency resource used by the base station to send the data on the first carrier. Duration of a transmission time interval of the fifth carrier CC5 is less than the duration of the transmission time interval of the second carrier CC2, and the time-frequency resource of the first carrier that is indicated by the first time-frequency resource indication information includes the time-frequency resource of the first carrier that is indicated by the third time-frequency resource indication information. As shown in FIG. 6, the third control information in a transmission time interval 0 of the fifth carrier CC5 is to be used by the user equipment to receive data in two transmission time intervals of the first carrier CC1. The first control information in a transmission time interval 0 of the second carrier CC2 is to be used by the user equipment to receive data in 10 transmission time intervals of the first carrier CC1. The time-frequency resource of the first carrier that is indicated by the first time-frequency resource indication information includes the time-frequency resource of the first carrier that is indicated by the third time-frequency resource indication information. Optionally, the frequency of the second carrier CC2 is less than a frequency of the fifth carrier CC5.

In an optional embodiment, the base station sends fourth control information on the first carrier CC1. The user equipment receives the fourth control information on the first carrier CC1. The base station sends the data on the first carrier according to the first control information, the second control information, the third control information, and the fourth control information. The user equipment receives the data on the first carrier according to the first control information, the second control information, the third control information, and the fourth control information. The fourth control information includes fourth time-frequency resource indication information, and the fourth time-frequency resource indication information is used to indicate a time-frequency resource used by the base station to send the data on the first carrier CC1. As shown in FIG. 6, the fourth control information in a transmission time interval 0 of the first carrier CC1 is to be used by the user equipment to receive data in one transmission time interval of the first carrier CC1. The third control information in a transmission time interval 0 of the fourth carrier CC4 is to be used by the user equipment to receive data in two transmission time intervals of the first carrier CC1. The time-frequency resource of the first carrier CC1 that is indicated by the third time-frequency resource indication information includes the time-frequency resource of the first carrier CC1 that is indicated by the fourth time-frequency resource indication information. Optionally, the frequency of the fourth carrier CC4 is less than the frequency of the first carrier CC1.

In an optional embodiment, the frequency domain resource of the first carrier CC1 that is indicated by the second time-frequency resource indication information includes the frequency domain resource of the first carrier CC1 that is indicated by the first time-frequency resource indication information. The frequency domain resource of the first carrier CC1 that is indicated by the first time-frequency resource indication information includes the frequency domain resource of the first carrier CC1 that is indicated by the third time-frequency resource indication information. The frequency domain resource of the first carrier CC1 that is indicated by the third time-frequency resource indication information includes the frequency domain resource of the first carrier CC1 that is indicated by the fourth time-frequency resource indication information. In this embodiment, the transmission time interval of the fourth carrier CC4 is greater than the transmission time interval of the second carrier CC2, the transmission time interval of the second carrier CC2 is greater than the transmission time interval of the fifth carrier CC5, and the transmission time interval of the fifth carrier CC5 is greater than the transmission time interval of the first carrier CC1. That is, the frequency of the fourth carrier CC4 is less than the frequency of the second carrier CC2, the frequency of the second carrier CC2 is less than the frequency of the fifth carrier CC5, and the frequency of the fifth carrier CC5 is less than the frequency of the first carrier CC1. Therefore, coverage and signal transmission reliability of the fourth carrier CC4 are greater than coverage and signal transmission reliability of the second carrier CC2, the coverage and signal transmission reliability of the second carrier CC2 are greater than coverage and signal transmission reliability of the fifth carrier CC5, and the coverage and signal transmission reliability of the fifth carrier CC5 are greater than coverage and signal transmission reliability of the first carrier CC1.

The foregoing design of transmitting, on multiple low-frequency carriers, control information of transmission data of a high-frequency carrier improves reliability and coverage of transmission of a control channel of a high-frequency carrier. In addition, considering an advantage that a time delay of signal transmission of a high-frequency carrier is low while a data transmission rate is high, the base station may configure different control information transmission carriers for different users. For example, for a cell center user whose channel transmission quality is relatively good, because signal transmission quality of the user is relatively good, the base station may configure that control information of transmission data of the user on the high-frequency carrier is transmitted on the high-frequency carrier. However, for a cell edge user whose channel transmission quality is relatively poor, because reliability of signal transmission of the user on the high-frequency carrier is relatively poor, the base station may configure that control information of transmission data of the user on the high-frequency carrier is transmitted on one or more low-frequency carriers. When the control information of the transmission data of the high-frequency carrier is transmitted on multiple low-frequency carriers, control information of the transmission data of the high-frequency carrier on the low-frequency carriers are differentially designed. That is, a frequency domain resource corresponding to the control information of the transmission data of the high-frequency carrier on a second low-frequency carrier is a subset of a frequency domain resource corresponding to the control information of the transmission data of the high-frequency carrier on a first low-frequency carrier. Compared with a control information indication manner in which bandwidths of an entire system are used as a universal set of frequency domain resources, a control information indication manner of transmission data of the high-frequency carrier on the second low-frequency carrier greatly reduces control signaling overheads.

When the control information of the transmission data of the high-frequency carrier is transmitted on multiple low-frequency carriers, optionally, the control information of the transmission data of the high-frequency carrier that is sent on the low-frequency carriers by the user may be completely the same. The user equipment combines and receives control information according to maximum control information that can be detected by the user equipment on the carriers. At the same time, the user feeds back, to the base station, a number of a carrier on which the control information is received. Therefore, coverage of the control information of the transmission data of the high-frequency carrier is maximally improved.

Optionally, the embodiment of FIG. 6 merely shows, by using examples, the control information of the data of the first carrier CC1 that is sent by the base station on the second carrier CC2, the fourth carrier CC4, and the fifth carrier CC5. A quantity of low-frequency carriers of the control information of the data of the first carrier CC1 that is sent by the base station is not limited in the present disclosure.

In an optional embodiment, the carrier indication information that is sent on the third carrier CC3 by the base station is further used to indicate the carrier on which the data that is sent by the base station according to the second control information, the third control information, or the fourth control information is located. In an optional embodiment, the carrier index number is used to indicate the carrier on which the data that is sent by the base station according to the second, the third or the fourth control information is located.

In an optional embodiment, the third carrier is a primary component carrier, and the first carrier, the second carrier, the fourth carrier, and the fifth carrier are secondary component carriers. In an optional embodiment, the third carrier and the first, the second, the fourth or the fifth carrier are a same carrier. That is, the primary component carrier may be any carrier. For example, the first carrier, the second carrier, the fourth carrier, or the fifth carrier is a primary component carrier.

FIG. 7 is a schematic diagram of communication on a carrier between a base station and user equipment according to another embodiment of the present disclosure. The carrier indication information further includes at least one of start transmission time interval information, time window length information, or end transmission time interval information. The start transmission time interval information is used to indicate a start transmission time interval of the data that is sent on the first carrier CC1 by the base station. The end transmission time interval information is used to indicate an end transmission time interval of the data that is sent on the first carrier CC1 by the base station. The time window length information is used to indicate a range of a transmission time interval occupied by the data that is sent on the first carrier CC1 by the base station. The base station sends the first control information on a control channel of a first transmission time interval of the second carrier. The base station sends the data according to the first control information and from the start transmission time interval to the end transmission time interval of the first carrier. The start transmission time interval is a next transmission time interval of a transmission time interval that is of the first carrier and that corresponds to the last symbol occupied by the control channel. The end transmission time interval is a transmission time interval that is of the first carrier and that corresponds to the last symbol occupied by a control channel of a second transmission time interval. The second transmission time interval is a next transmission time interval of the first transmission time interval.

Specifically, in the embodiment of FIG. 7, the base station sends control information in a TTI 0 of a second carrier CC2 that is of a low frequency compared with the first carrier CC1. The base station sends data in a TTI 2 to a TTI n of the high-frequency first carrier CC1 according to the control information, where n is a natural number. The user equipment receives the control information in the TTI 0 of the second carrier CC2. The user equipment receives the data in the TTI 2 to the TTI n of the first carrier CC1 according to the control information. The TTI 2 of the first carrier CC1 is a next TTI of a TTI 1 that is of the first carrier CC1 and that corresponds to the last symbol of a physical downlink control channel (PDCCH) of the TTI 0 of the second carrier. The TTI 2 of the first carrier CC1 is a start TTI in which the base station sends the data according to the control information. The TTI n of the first carrier CC1 is a TTI corresponding to the last symbol of a PDCCH of a TTI 1 of the second carrier CC2. The TTI n of the first carrier CC1 is an end TTI in which the base station sends the data according to the control information. The time window length information indicates a range of a transmission time interval, that is, the TTI 2 to the TTI n, occupied by the data that is sent by the base station on the first carrier CC1. For example, the time window length information includes TTI quantity information. For example, the TTI quantity information is used to indicate that a quantity of TTIs occupied by the TTI 2 to the TTI n is n−1.

Figure 8:
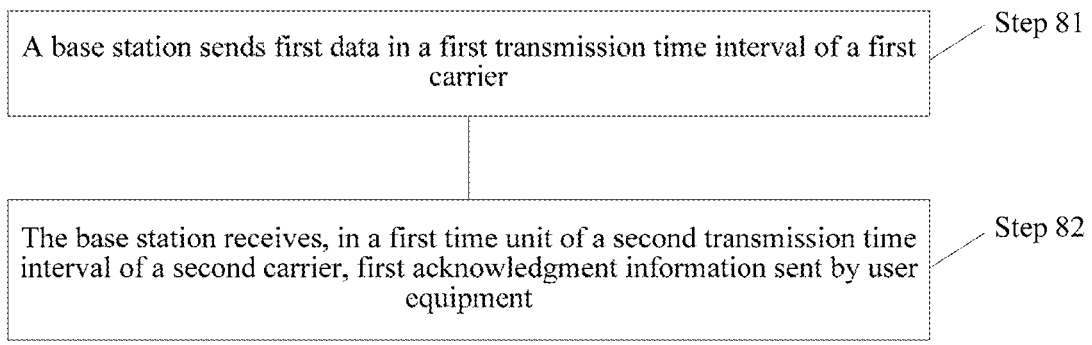
FIG. 8 shows a control information receiving method according to an embodiment of the present disclosure.

FIG. 8 is a control information receiving method according to an embodiment of the present disclosure. The method includes the following steps.

Step 81: A base station sends first data in a first transmission time interval of a first carrier.

Step 82: The base station receives, in a first time unit of a second transmission time interval of a second carrier, first acknowledgment information sent by user equipment. The first acknowledgment information is used to indicate whether the user equipment correctly receives the first data, and duration of the first transmission time interval of the first carrier is less than duration of the second transmission time interval of the second carrier. Optionally, the first acknowledgment information is acknowledgment (ACK) information or negative acknowledgment (NACK) information.

In an optional embodiment, the base station receives the first acknowledgment information in a second time unit of the second transmission time interval of the second carrier, where the first acknowledgment information is used to indicate whether the user equipment correctly receives the first data, and the second time unit and the first time unit are different time units.

In an optional embodiment, the base station sends second data in a third transmission time interval of the first carrier, where the third transmission time interval and the first transmission time interval are different transmission time intervals; and the base station receives second acknowledgment information in the first time unit of the second transmission time interval of the second carrier, where the second acknowledgment information is used to indicate whether the user equipment correctly receives the second data. Optionally, the base station receives one acknowledgment message in the first time unit of the second transmission time interval of the second carrier. The acknowledgment message includes the first acknowledgment information and the second acknowledgment information.

In an optional embodiment, the first carrier is a downlink carrier, and the second carrier is an uplink carrier.

Figure 9:
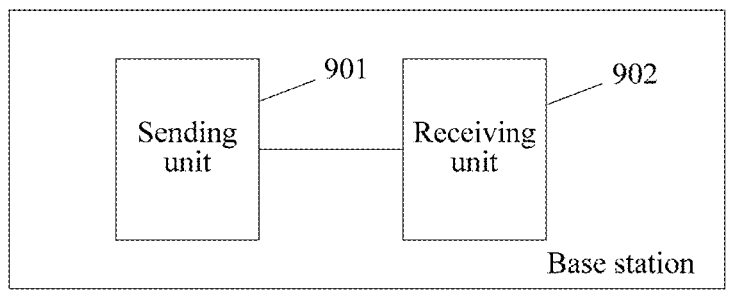
FIG. 9 shows a control information transmission apparatus according to an embodiment of the present disclosure.

FIG. 9 shows a control information transmission apparatus, that is, a base station, according to an embodiment of the present disclosure. The base station is configured to perform the control information transmission method in the embodiment of FIG. 8. The base station includes a sending unit 901 and a receiving unit 902. The sending unit 901 is configured to send first data in a first transmission time interval of a first carrier. The receiving unit 902 is configured to receive, in a first time unit of a second transmission time interval of a second carrier, first acknowledgment information sent by user equipment, where the first acknowledgment information is used to indicate whether the user equipment correctly receives the first data, and the first transmission time interval of the first carrier is less than the second transmission time interval of the second carrier.

In an optional embodiment, the receiving unit 902 receives the first acknowledgment information in a second time unit of the second transmission time interval of the second carrier, where the first acknowledgment information is used to indicate whether the user equipment correctly receives the first data, and the second time unit and the first time unit are different time units.

In an optional embodiment, the sending unit 901 sends second data in a third transmission time interval of the first carrier, where the third transmission time interval and the first transmission time interval are different transmission time intervals. The receiving unit 902 receives second acknowledgment information in the first time unit of the second transmission time interval of the second carrier, where the second acknowledgment information is used to indicate whether the user equipment correctly receives the second data. Optionally, the receiving unit 902 receives one acknowledgment message in the first time unit of the second transmission time interval of the second carrier. The acknowledgment message includes the first acknowledgment information and the second acknowledgment information.

In an optional embodiment, the first carrier is a downlink carrier, and the second carrier is an uplink carrier.

In an optional implementation manner, the receiving unit 902 may be a receiver (receiver), and the sending unit 901 may be a transmitter. Alternatively, the receiving unit 902 and the sending unit 901 may be implemented by using a transceiver. The receiver, the transmitter, and the transceiver may be a radio frequency circuit or a combination that includes the processor and a radio frequency circuit. The base station includes a receiver and a transmitter. The transmitter is configured to send the first data in the first transmission time interval of the first carrier. The receiver is configured to receive, in the first time unit of the second transmission time interval of the second carrier, the first acknowledgment information sent by the user equipment. The first acknowledgment information is used to indicate whether the user equipment correctly receives the first data. The first transmission time interval of the first carrier is less than the second transmission time interval of the second carrier.

Figure 10:
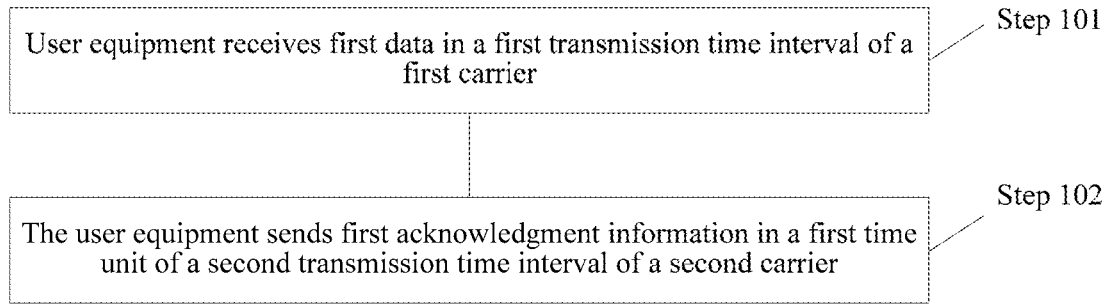
FIG. 10 shows a control information transmission method according to an embodiment of the present disclosure.

FIG. 10 is a control information transmission method according to an embodiment of the present disclosure. The method includes the following specific steps.

Step 101: User equipment receives first data in a first transmission time interval of a first carrier.

Step 102: The user equipment sends first acknowledgment information in a first time unit of a second transmission time interval of a second carrier. The first acknowledgment information is used to indicate whether the user equipment correctly receives the first data, and duration of the first transmission time interval of the first carrier is less than duration of the second transmission time interval of the second carrier. Optionally, the first acknowledgment information is ACK information or NACK information.

In an optional embodiment, the user equipment sends the first acknowledgment information in a second time unit of the second transmission time interval of the second carrier, where the first acknowledgment information is used to indicate whether the user equipment correctly receives the first data, and the second time unit and the first time unit are different time units.

In an optional embodiment, the user equipment receives second data in a third transmission time interval of the first carrier, where the third transmission time interval and the first transmission time interval are different transmission time intervals. The user equipment receives second acknowledgment information in the first time unit of the second transmission time interval of the second carrier, where the second acknowledgment information is used to indicate whether the user equipment correctly receives the second data. Optionally, the user equipment sends one acknowledgment message in the first time unit of the second transmission time interval of the second carrier. The acknowledgment message includes the first acknowledgment information and the second acknowledgment information.

In an optional embodiment, the first carrier is a downlink carrier, and the second carrier is an uplink carrier.

Figure 11:
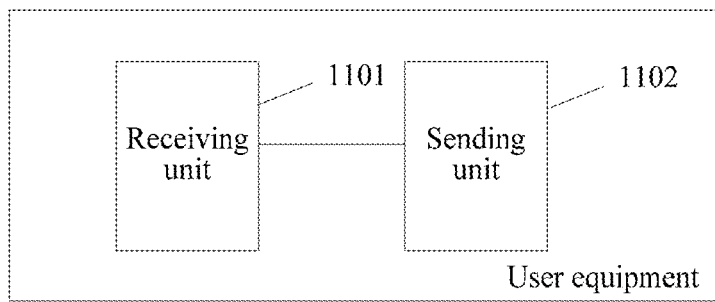
FIG. 11 shows a control information transmission apparatus according to an embodiment of the present disclosure.

FIG. 11 shows a control information transmission apparatus, that is, user equipment, according to an embodiment of the present disclosure. The user equipment is configured to perform the control information transmission method in the embodiment of FIG. 10. The user equipment includes a receiving unit 1101 and a sending unit 1102.

The receiving unit 1101 is configured to receive first data in a first transmission time interval of a first carrier.

The sending unit 1102 is configured to send first acknowledgment information in a first time unit of a second transmission time interval of a second carrier, where the first acknowledgment information is used to indicate whether the receiving unit correctly receives the first data, and the first transmission time interval of the first carrier is less than the second transmission time interval of the second carrier.

In an optional embodiment, the sending unit is further configured to send the first acknowledgment information in a second time unit of the second transmission time interval of the second carrier, where the first acknowledgment information is used to indicate whether the receiving unit correctly receives the first data, and the second time unit and the first time unit are different time units.

In an optional embodiment, the receiving unit is further configured to receive second data in a third transmission time interval of the first carrier, where the third transmission time interval and the first transmission time interval are different transmission time intervals. The sending unit is further configured to send second acknowledgment information in the first time unit of the second transmission time interval of the second carrier, where the second acknowledgment information is used to indicate whether the receiving unit correctly receives the second data. Optionally, the sending unit 1102 sends one acknowledgment message in the first time unit of the second transmission time interval of the second carrier. The acknowledgment message includes the first acknowledgment information and the second acknowledgment information.

In an optional embodiment, the first carrier is a downlink carrier, and the second carrier is an uplink carrier.

In an optional implementation manner, the receiving unit 1101 may be a receiver, and the sending unit 1102 may be a transmitter. Alternatively, the receiving unit 1101 and the sending unit 1102 may be implemented by using a transceiver. The receiver, the transmitter, and the transceiver may be a radio frequency circuit or a combination that includes the processor and a radio frequency circuit. The user equipment includes a receiver and a transmitter. The receiver is configured to receive the first data in the first transmission time interval of the first carrier. The transmitter is configured to send the first acknowledgment information in the first time unit of the second transmission time interval of the second carrier. The first acknowledgment information is used to indicate whether the receiving unit correctly receives the first data. The first transmission time interval of the first carrier is less than the second transmission time interval of the second carrier.

Figure 12:
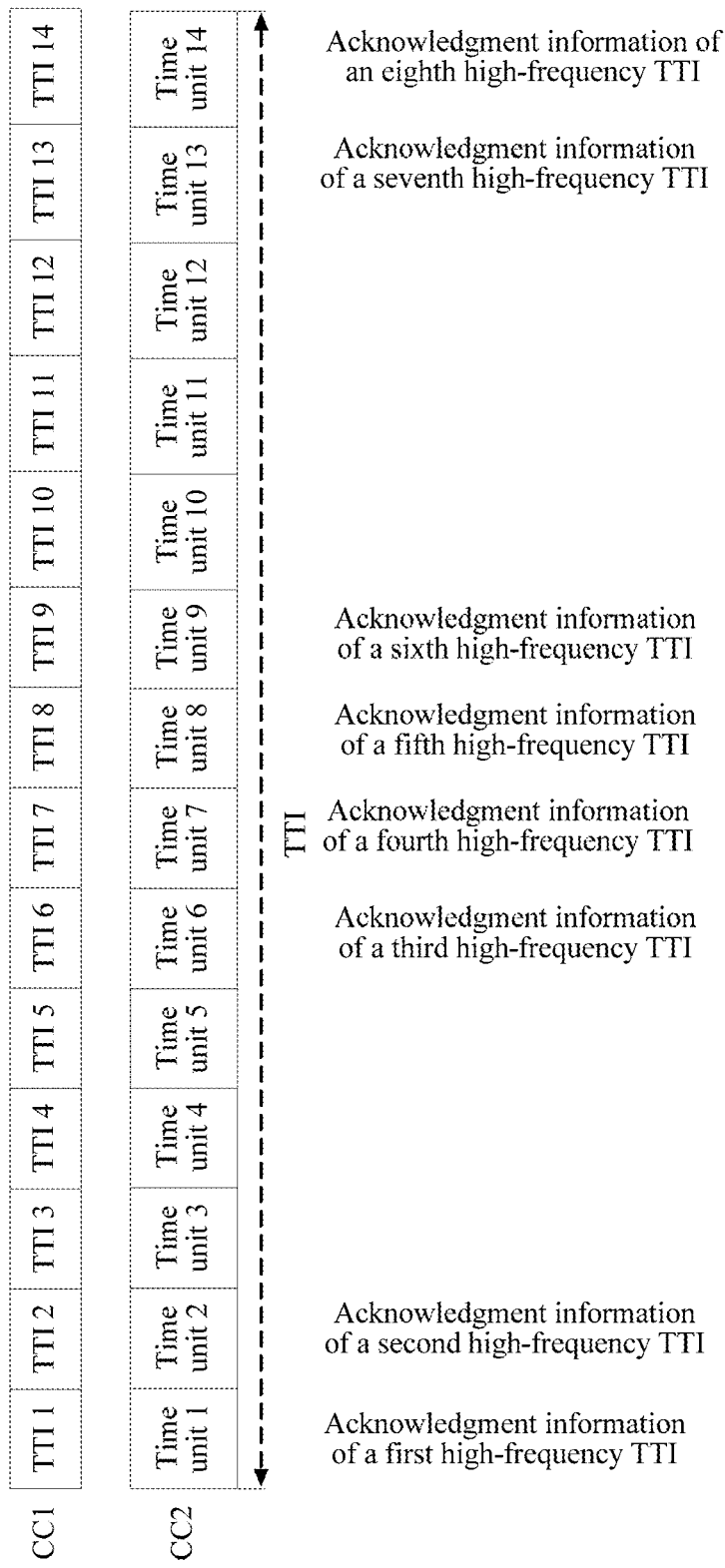
FIG. 12 is a schematic diagram of control information transmission according to an embodiment of the present disclosure.

FIG. 12 is a schematic diagram of control information transmission according to an embodiment of the present disclosure.

A base station sends first data in a first transmission time interval TTI 1 of a first carrier CC1. User equipment receives the first data. The user equipment sends first acknowledgment information in a first time unit 1 of a second transmission time interval of a second carrier CC2. The base station receives, in the first time unit of the second transmission time interval of the second carrier CC2, the first acknowledgment information sent by the user equipment. The first acknowledgment information is used to indicate whether the user equipment correctly receives the first data. Duration of the first transmission time interval of the first carrier CC1 is less than duration of the second transmission time interval of the second carrier CC2. The time unit may be an orthogonal frequency division multiplexing (OFDM) symbol.

Figure 13:
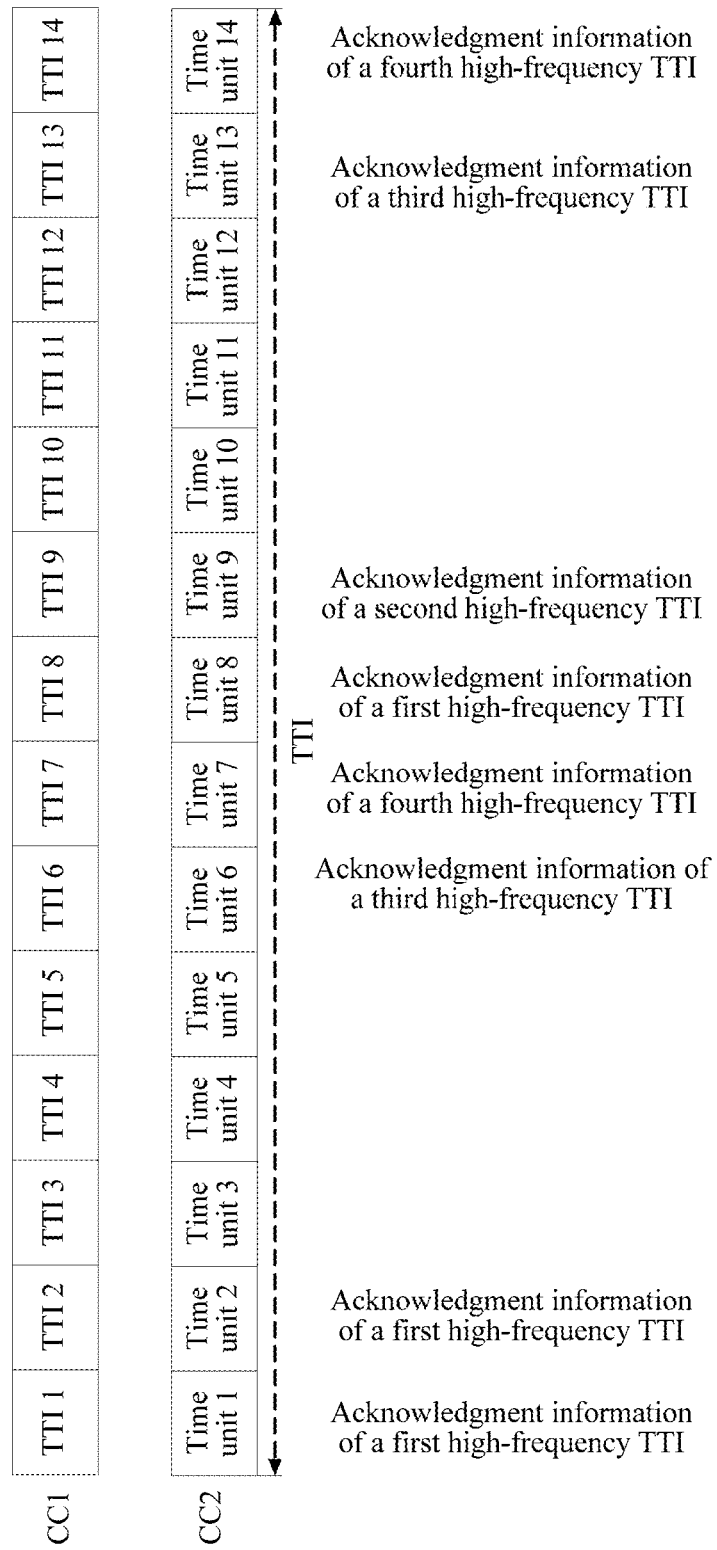
FIG. 13 is a schematic diagram of control information transmission according to another embodiment of the present disclosure.

FIG. 13 is a schematic diagram of control information transmission according to another embodiment of the present disclosure. Differences of the embodiment of FIG. 13 from the embodiment of FIG. 12 lie in that the base station sends data in a TTI 1 to a TTI 4 of the first carrier CC1, and after the user equipment receives the data in the TTI 1 to the TTI 4 of the first carrier CC1, the user equipment sends the first acknowledgment information in a time unit 1, a time unit 2, and a time unit 8 of the second transmission time interval of the second carrier CC2, where the first acknowledgment information is used to indicate whether the user equipment correctly receives the data in the TTI 1 of the first carrier CC1, and the time unit 2, the time unit 8, and the time unit 1 are different time units. Optionally, the first acknowledgment information may be sent in one or more time units of a transmission time unit of the second carrier CC2. The user equipment sends second acknowledgment information in a time unit 9 of the second transmission time interval of the second carrier CC2. The second acknowledgment information is used to indicate whether the user equipment correctly receives the data in the TTI 2 of the first carrier CC1. The user equipment sends third acknowledgment information in time units 6 and 13 of the second transmission time interval of the second carrier CC2. The third acknowledgment information is used to indicate whether the user equipment correctly receives the data in the TTI 3 of the first carrier CC1. The user equipment sends fourth acknowledgment information in time units 7 and 14 of the second transmission time interval of the second carrier CC2. The fourth acknowledgment information is used to indicate whether the user equipment correctly receives the data in the TTI 4 of the first carrier CC1.

Figure 14:
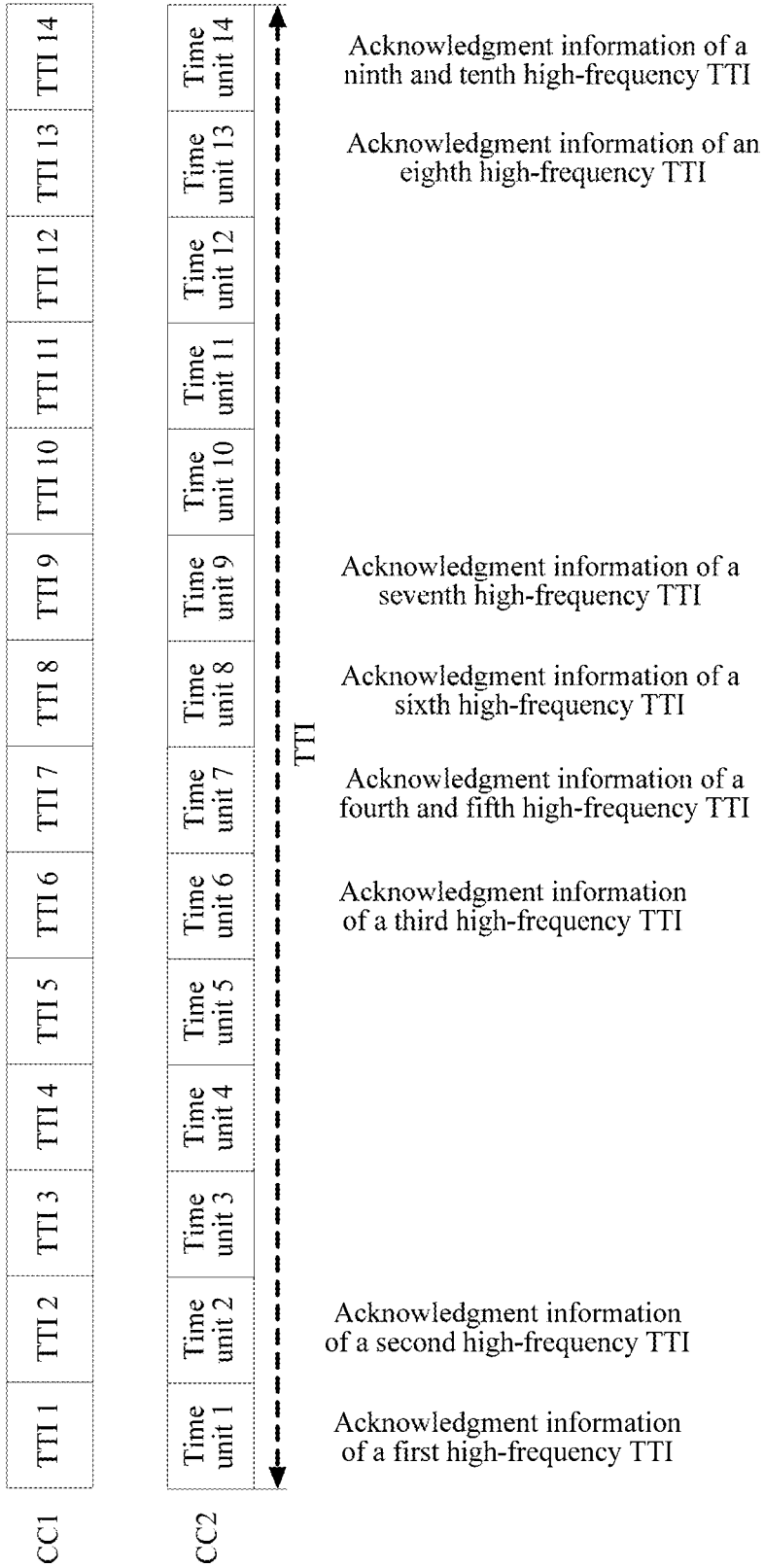
FIG. 14 is a schematic diagram of control information transmission according to still another embodiment of the present disclosure.

FIG. 14 is a schematic diagram of a carrier for control information transmission according to still another embodiment of the present disclosure. Differences of the embodiment of FIG. 14 from the embodiment of FIG. 12 lie in that the base station sends data in a TTI 1 to a TTI 10 of the first carrier CC1, and after the user equipment receives the data in the TTI 1 to the TTI 10 of the first carrier CC1, the user equipment sends the first acknowledgment information in a time unit 1 of the second transmission time interval of the second carrier CC2, where the first acknowledgment information is used to indicate whether the user equipment correctly receives the data in the TTI 1 of the first carrier CC1. The user equipment sends second acknowledgment information in a time unit 2 of the second transmission time interval of the second carrier CC2. The second acknowledgment information is used to indicate whether the user equipment correctly receives the data in the TTI 2 of the first carrier CC1. The user equipment sends third acknowledgment information in a time unit 6 of the second transmission time interval of the second carrier CC2. The third acknowledgment information is used to indicate whether the user equipment correctly receives the data in the TTI 3 of the first carrier CC1. The user equipment sends fourth acknowledgment information in a time unit 7 of the second transmission time interval of the second carrier CC2. The fourth acknowledgment information is used to indicate whether the user equipment correctly receives the data in the TTI 4 and the TT5 of the first carrier CC1. The user equipment sends fifth acknowledgment information in a time unit 8 of the second transmission time interval of the second carrier CC2. The fifth acknowledgment information is used to indicate whether the user equipment correctly receives the data in the TTI 6 of the first carrier CC1. The user equipment sends sixth acknowledgment information in a time unit 9 of the second transmission time interval of the second carrier CC2. The sixth acknowledgment information is used to indicate whether the user equipment correctly receives the data in the TTI 7 of the first carrier CC1. The user equipment sends seventh acknowledgment information in a time unit 13 of the second transmission time interval of the second carrier CC2. The seventh acknowledgment information is used to indicate whether the user equipment correctly receives the data in the TTI 8 of the first carrier CC1. The user equipment sends eighth acknowledgment information in a time unit 14 of the second transmission time interval of the second carrier CC2. The eighth acknowledgment information is used to indicate whether the user equipment correctly receives the data in the TTI 9 and the TTI 10 of the first carrier CC1.

In all the foregoing embodiments, control information of data that is sent by a base station on a high-frequency carrier is transmitted on a low-frequency carrier, so as to improve transmission reliability and transmission quantity of the control information. Duration of a transmission time interval of the high-frequency carrier is less than duration of a transmission time interval of the low-frequency carrier. In another embodiment of the present disclosure, the control information of the data that is sent by the base station on the high-frequency carrier is sent on the high-frequency carrier. To enhance transmission reliability of the control information sent on the high-frequency carrier, bundling transmission of the control information is performed in multiple TTIs. The control information transmitted in the multiple TTIs may be same control information repeatedly transmitted for multiple times. The base station configures, for a user, different quantities of TTIs for bundling transmission of control information, that is, a control information multiple-TTI bundling transmission solution specified by a user. Correspondingly, an aggregation level supported by each user equipment, including a lowest aggregation level, can be flexibly configured according to a quantity of bundling TTIs of control information that is specified by the user. For example, in order not to increase a quantity of times of blind detection by the user, when bundling transmission of control information is performed in multiple TTIs, a control format supported by the user equipment is different from a control format during non-bundling transmission. For example, a lowest aggregation level that is supported by the user equipment during bundling transmission in multiple TTIs is greater than a lowest aggregation level during non-bundling transmission. Specifically, a lowest aggregation level that can be supported by bundling transmission of multiple TTIs is related to a quantity of bundling TTIs of control information that is configured by the base station. For example, when the quantity of bundling TTIs is 1, corresponding lowest aggregation levels of the user equipment in different scenarios are separately 1 and 2. When the quantity of bundling TTIs is N, and N is a natural number, the corresponding lowest aggregation levels of the user equipment in different scenarios are separately extended to 1×N and 2×N.

Without conflicts, the embodiments in the present disclosure and the features in the embodiments may be mutually combined.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A control information transmission method performed by a base station using a first carrier and a second carrier, the method comprising:
sending, by the base station, first control information on the second carrier to a user equipment, wherein the first control information provides information to the user equipment regarding data to be sent to the user equipment from the base station; and
sending, by the base station, the data on the first carrier according to the first control information to the user equipment;
wherein a duration of a transmission time interval of the first carrier is less than a duration of a transmission time interval of the second carrier.

2. The method according to claim 1, wherein the base station further uses a third carrier, and the method further comprises:
sending, by the base station, carrier indication information on a third carrier, wherein the carrier indication information is used to indicate a carrier on which the data that is sent by the base station according to the first control information is located.

3. The method according to claim 2, wherein the carrier indication information comprises a carrier index number, and the carrier index number is used to indicate the carrier on which the data that is sent by the base station according to the first control information is located.

4. The method according to claim 2, wherein:
the carrier indication information further comprises at least one of start transmission time interval information, time window length information, or end transmission time interval information; and
the start transmission time interval information is used to indicate a start transmission time interval of the data that is sent on the first carrier by the base station, the end transmission time interval information is used to indicate an end transmission time interval of the data that is sent on the first carrier by the base station, and the time window length information is used to indicate a range of a transmission time interval occupied by the data that is sent on the first carrier by the base station.

5. The method according to claim 2, wherein the base station further users a fourth carrier; and
wherein the first control information comprises first time-frequency resource indication information, the first time-frequency resource indication information is used to indicate a time-frequency resource used by the base station to send the data on the first carrier, and the method further comprises:
sending, by the base station, second control information on the fourth carrier; and
sending, by the base station, the data on the first carrier according to the first control information comprises:
sending, by the base station, the data on the first carrier according to the first control information and the second control information, wherein the second control information comprises second time-frequency resource indication information, the second time-frequency resource indication information is used to indicate a time-frequency resource used by the base station to send the data on the first carrier, a duration of a transmission time interval of the fourth carrier is greater than the duration of the transmission time interval of the second carrier, and the time-frequency resource of the first carrier that is indicated by the second time-frequency resource indication information comprises the time-frequency resource of the first carrier that is indicated by the first time-frequency resource indication information.

6. A base station configured to use a first carrier and a second carrier, the base station comprising:
a transmitter, configured to:
send first control information on the second carrier to a user equipment, wherein the first control information provides information to the user equipment regarding data to be sent to the user equipment from the base station; and
send the data on the first carrier according to the first control information to the user equipment;
wherein a duration of a transmission time interval of the first carrier is less than a duration of a transmission time interval of the second carrier.

7. The base station according to claim 6, wherein the base station is further configured to use a third carrier, and the transmitter is further configured to send carrier indication information on the third carrier, wherein the carrier indication information is used to indicate a carrier on which the data that is sent by the transmitter according to the first control information is located.

8. The base station according to claim 7, wherein the earner indication information comprises a carrier index number, and the carrier index number is used to indicate the carrier on which the data that is sent by the base station according to the first control information is located.

9. The base station according to claim 7, wherein:
the carrier indication information further comprises at least one of start transmission time interval information, time window length information, or end transmission time interval information; and
the start transmission time interval information is used to indicate a start transmission time interval of the data that is sent on the first carrier by the transmitter, the end transmission time interval information is used to indicate an end transmission time interval of the data that is sent on the first carrier by the transmitter, and the time window length information is used to indicate a range of a transmission time interval occupied by the data that is sent on the first carrier by the transmitter.

10. The base station according to claim 7, wherein the base station is further configured to use a fourth carrier; and
wherein the first control information comprises first time-frequency resource indication information, the first time-frequency resource indication information is used to indicate a time-frequency resource used by the transmitter to send the data on the first carrier, and the transmitter is further configured to:
send second control information on the fourth carrier; and
send the data on the first carrier according to the first control information and the second control information, wherein the second control information comprises second time-frequency resource indication information, the second time-frequency resource indication information is used to indicate a time-frequency resource used by the transmitter to send the data on the first carrier, duration of a transmission time interval of the fourth carrier is greater than the duration of the transmission time interval of the second carrier, and the time-frequency resource of the first carrier that is indicated by the second time-frequency resource indication information comprises the time-frequency resource of the first carrier that is indicated by the first time-frequency resource indication information. 11. A control information receiving method for a user equipment communicating with a base station over a first carrier and a second carrier, the method comprising:
   receiving, by the user equipment, first control information on the second carrier from the base station, wherein the first control information provides information to the user equipment regarding data to be sent to the user equipment from the base station; and
   receiving, by the user equipment, the data on the first carrier according to the first control information from the base station;
   wherein a duration of a transmission time interval of the first carrier is less than a duration of a transmission time interval of the second carrier.

12. The method according to claim 11, wherein the user equipment further communicates with the base station over a third carrier, and the method further comprises:
   receiving, by the user equipment, carrier indication information on the third carrier, wherein the carrier indication information is used to indicate a carrier on which the data that is received by the user equipment according to the first control information is located.

13. The method according to claim 12, wherein the carrier indication information comprises a carrier index number, and the carrier index number is used to indicate the carrier on which the data that is received by the user equipment according to the first control information is located.

14. The method according to claim 12, wherein:
   the carrier indication information further comprises at least one of start transmission time interval information, time window length information, or end transmission time interval information; and
   the start transmission time interval information is used to indicate a start transmission time interval of the data that is received on the first carrier by the user equipment, the end transmission time interval information is used to indicate an end transmission time interval of the data that is received on the first carrier by the user equipment, and the time window length information is used to indicate a range of a transmission time interval occupied by the data that is received on the first carrier by the user equipment.

15. The method according to claim 12, wherein the user equipment further communicates with the base station over a fourth carrier; and
   wherein the first control information comprises first time-frequency resource indication information, the first time-frequency resource indication information is used to indicate a time-frequency resource used by the user equipment to receive the data on the first carrier, and the method further comprises:
   receiving, by the user equipment, second control information on the fourth carrier; and
   receiving, by the user equipment, the data on the first carrier according to the first control information and the second control information, wherein the second control information comprises second time-frequency resource indication information, the second time-frequency resource indication information is used to indicate a time-frequency resource used by the user equipment to receive the data on the first carrier, duration of a transmission time interval of the fourth carrier is greater than the duration of the transmission time interval of the second carrier, and the time-frequency resource of the first carrier that is indicated by the second time-frequency resource indication information comprises the time-frequency resource of the first carrier that is indicated by the first time-frequency resource indication information.

16. A user equipment configured to communicate with a base station over a first carrier and a second carrier, the user equipment comprising:
   a receiver, configured to:
   receive first control information on the second carrier from the base station, wherein the first control information provides information to the user equipment regarding data to be sent to the user equipment from the base station; and
   receive the data on the first carrier according to the first control information from the base station;
   wherein a duration of a transmission time interval of the first carrier is less than a duration of a transmission time interval of the second carrier.

17. The user equipment according to claim 16, wherein the user equipment is further configured to communicate with the base station over a third carrier, and the receiver receives carrier indication information on the third carrier, wherein the carrier indication information is used to indicate a carrier on which the data that is received by the user equipment according to the first control information is located.

18. The user equipment according to claim 17, wherein the carrier indication information comprises a carrier index number, and the carrier index number is used to indicate the carrier on which the data that is received by the receiver according to the first control information is located.

19. The user equipment according to claim 17, wherein:
   the carrier indication information further comprises at least one of start transmission time interval information, time window length information, or end transmission time interval information; and
   the start transmission time interval information is used to indicate a start transmission time interval of the data that is received on the first carrier by the receiver, the end transmission time interval information is used to indicate an end transmission time interval of the data that is received on the first carrier by the receiver, and the time window length information is used to indicate a range of a transmission time interval occupied by the data that is received on the first carrier by the receiver.

20. The user equipment according to claim 17, wherein the user equipment is further configured to communicate with the base station over a fourth carrier; and
   wherein the first control information comprises first time-frequency resource indication information, the first time-frequency resource indication information is used to indicate a time-frequency resource used by the receiver to receive the data on the first carrier, and the receiver is further configured to:
   receive second control information on the fourth carrier; and
   receive the data on the first carrier according to the first control information and the second control information, wherein the second control information comprises second time-frequency resource indication information, the second time-frequency resource indication information is used to indicate a time-frequency resource used by the receiver to receive the data on the first carrier, duration of a transmission time interval of the fourth carrier is greater than the duration of the transmission time interval of the second carrier, and the time-frequency resource of the first carrier that is indicated by the second time-frequency resource indication information comprises the time-frequency resource of the first carrier that is indicated by the first time-frequency resource indication information.

* * * * *